(12) United States Patent
Vemury

(10) Patent No.: US 12,437,583 B2
(45) Date of Patent: Oct. 7, 2025

(54) MORPHED IMAGE DETECTION LOGIC AND SURVEILLANCE SYSTEMS

(71) Applicant: The Government of the United States of America, as represented by the Secretary of Homeland Security, Washington, DC (US)

(72) Inventor: Arun Vemury, North Bethesda, MD (US)

(73) Assignee: The Government of the United States of America, Secretary of Homeland Security, Washington, DC (US)

( * ) Notice: Subject to any disclaimer, the term of this patent is extended or adjusted under 35 U.S.C. 154(b) by 0 days.

(21) Appl. No.: 19/047,488

(22) Filed: Feb. 6, 2025

(65) Prior Publication Data

US 2025/0191408 A1    Jun. 12, 2025

Related U.S. Application Data

(63) Continuation-in-part of application No. 18/918,245, filed on Oct. 17, 2024, now abandoned.

(Continued)

(51) Int. Cl.
| | |
|---|---|
| *G06V 40/40* | (2022.01) |
| *G06V 10/74* | (2022.01) |
| *G06V 10/776* | (2022.01) |
| *G06V 20/52* | (2022.01) |
| *G06V 40/16* | (2022.01) |

(Continued)

(52) U.S. Cl.
CPC ............ *G06V 40/40* (2022.01); *G06V 10/761* (2022.01); *G06V 10/776* (2022.01); *G06V 20/52* (2022.01); *G06V 40/172* (2022.01); *G06V 40/50* (2022.01); *G07C 9/257* (2020.01)

(58) Field of Classification Search
CPC ...... G06V 40/40; G06V 40/172; G06V 40/50; G06V 10/761; G06V 10/776; G06V 20/52; G07C 9/257
See application file for complete search history.

(56) References Cited

U.S. PATENT DOCUMENTS

| | | |
|---|---|---|
| 11,605,220 B2 * | 3/2023 | Ge .......................... G06V 20/52 |
| 11,967,184 B2 * | 4/2024 | Hassani ............... G06V 40/167 |

(Continued)

OTHER PUBLICATIONS

Rathgeb, Christian, et al., "Handbook of Digital Face Manipulation and Detection—from DeepFakes to Morphing Attacks", Jan. 31, 2022, Springer Cham, https://doi.org/10.1007/978-3-030-87664-7.

(Continued)

*Primary Examiner* — John B Strege
(74) *Attorney, Agent, or Firm* — Kelly G. Hyndman; Robert W. Busby

(57) ABSTRACT

Aspects of the present invention relate to machines, systems, and methods for detecting a morphed image on an ID card associated with a user. The invention may comprise a plurality of security kiosks, a user database, morphed image detection logic, surveillance cameras, a surveillance database, surveillance similarity logic, user identification logic, message logic, and detainment logic. The machines, systems, and methods may assist an operator in controlling access of an individual using an ID bearing a morphed image.

15 Claims, 29 Drawing Sheets
(13 of 29 Drawing Sheet(s) Filed in Color)

Related U.S. Application Data

(60) Provisional application No. 63/544,577, filed on Oct. 17, 2023.

(51) Int. Cl.
  G06V 40/50 (2022.01)
  G07C 9/25 (2020.01)

(56) References Cited

U.S. PATENT DOCUMENTS

| | | |
|---|---|---|
| 2003/0086591 A1 | 5/2003 | Simon |
| 2011/0080315 A1* | 4/2011 | Reilly .................... G01S 13/86 |
| | | 342/175 |
| 2017/0116705 A1 | 4/2017 | Kim et al. |
| 2018/0181794 A1 | 6/2018 | Benini et al. |
| 2019/0266314 A1 | 8/2019 | Trelin |
| 2020/0175290 A1 | 6/2020 | Raja et al. |
| 2020/0218885 A1 | 7/2020 | Budhrani et al. |
| 2023/0206699 A1* | 6/2023 | Chua ................... G06V 40/168 |
| | | 382/118 |
| 2024/0273950 A1* | 8/2024 | Trundle ............. G07C 9/00182 |

OTHER PUBLICATIONS

Raghavendra, et al., "Detecting-Morphed-Face-Images", Norwegian Biometrics Laboratory, NTNU, Gjøvik, Norway, (2016) 10.1109/BTAS.2016.7791169.

Debiasi et al., "PRNU-based-Detection-of-Morphed-Face-Images", (Year: 2018).

\* cited by examiner

90

Researchers have demonstrated it is possible for a passport or photoID to used by more than one person

Sept. 22, 2018: Member of German activist group successfully applies for a passport with a morphed image (containing Federica Mogherini, High Representative of the Union for Foreign Affairs and Security Policy)
Fig. 16

Two-image Differential

Morph detection with additional live capture image
(e.g., morph on passport + eGate webcam photo)

A. is an original image. B. is a morphed image contained in a passport. An eGate machine captures C. There is no mole on C. The surveillance similarity logic may be configured dissimilarity logic can be configured to determine

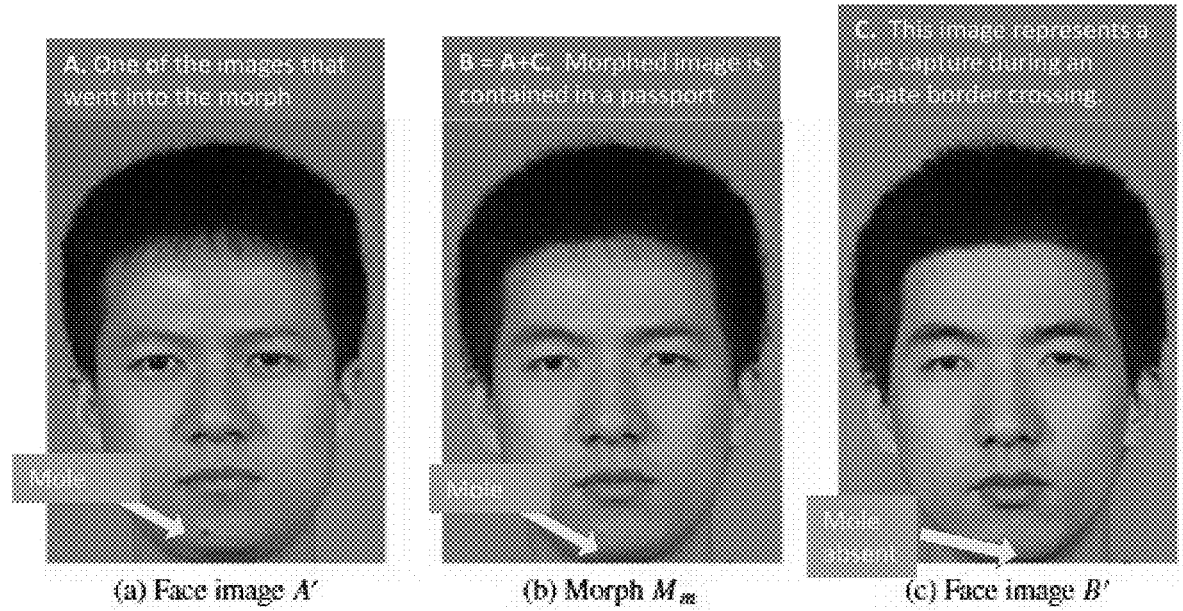

(a) Face image $A'$     (b) Morph $M_{ab}$     (c) Face image $B'$

Fig. 17

Example (face_morpher)
1301
1302
1303
Fig. 18

Example (OpenCV)
 + 
1301  1302
=
1304
Fig. 19

Example (StyleGAN2)
1301
1302
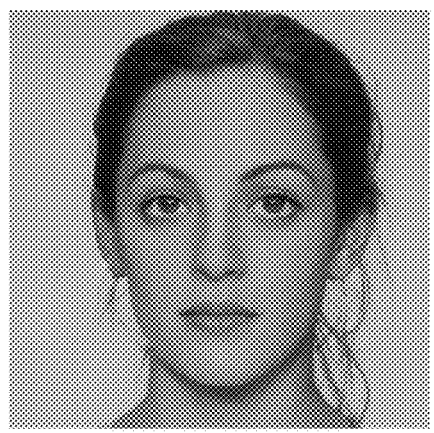
1305
Fig. 20

Example (face-blend)
1301
1302
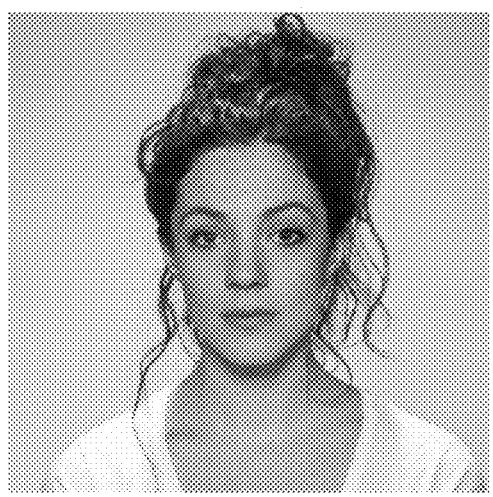
1306
Fig. 21

Sample Semafor Component Evaluation

"purdue-polimi-jpeg-manipulation-detection-0-3-0" run against 1306 genuine and 1500 morphed images

Sample Online Forensic Tool

Sample Online Forensic Tool
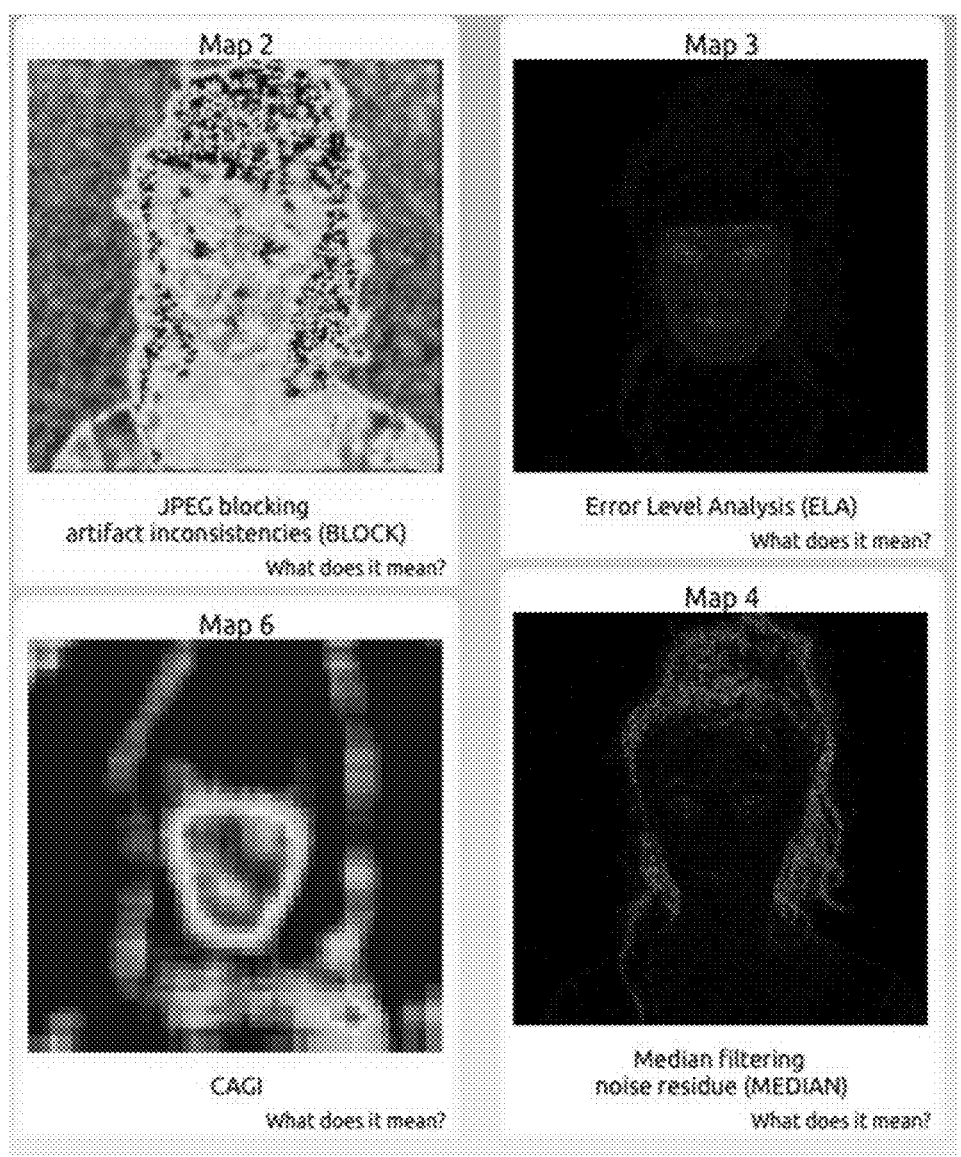
Fig. 29

MORPHED IMAGE DETECTION LOGIC AND SURVEILLANCE SYSTEMS

CROSS-REFERENCES

This application is a continuation in part of U.S. patent application Ser. No. 18/918,245 filed Oct. 17, 2024 which claims the benefit of priority to U.S. Provisional Application No. 63/544,577 incorporated by reference in its entirety.

STATEMENT OF GOVERNMENT INTEREST

The present invention was made by employees of the United States Department of Homeland Security in the performance of their official duties. The U.S. Government has certain rights in this invention.

FIELD

The invention relates generally to methods and systems for detecting a morphed image.

BACKGROUND

Disclosed is a machine for detecting a morphed image on an ID card. Morphing is a technique of changing an image on an ID card and/or generating an image that resembles more than one person. Normally, a facial image on an ID card uniquely associates that ID card with the individual to which the ID card was issued. A user may create a modified image with post image processing or makeup so that the image also resembles a second user. A user may also use morphing software to modify (e.g., morph) the image so that it resembles more than one person. The biographic information stored on the ID card would not match the second user, but a verification system or a security guard might rely only on the biometric information matching (facial image) when making a positive identity match. This scenario can create numerous security risks that generate the potential for criminals to enter secure areas, purpurate credit card fraud, or even frame an innocent person.

A morphed image of a person or person's face may comprise an image that has been altered using morphing technology (computers and computer morphing software) to change the picture ("electronically morphed image"). A morphed image may resemble more than one person. A person may wear makeup or a disguise so that a picture taken by the person or a third party resembles more than one person ("organically morphed image").

In some cases, the person generating the morphed image deliberately selects a target person for the morph. Such a technique can be used to impersonate the target or gain access to a device or location that the target has permission to access.

Humans have a limited ability to identity people from a photo in an ID. For example, a study of the Australian Passport Office found a 14% false match error rate (i.e., officers decided that the photograph matched the face of the person standing in front of them, when in fact, the photograph showed an entirely different person). The study found that passport issuing officers are no better at comparing people to photo IDs than the average person.

This application incorporates by reference the following U.S. Patents and U.S. Patent Application Publications, and/ or commonly owned U.S. Patent Applications in their entirety:

U.S. Pat. No. 12,073,482 granted Aug. 27, 2024, "Selective Biometric Access Control" by Arun Vemury, incorporated by reference in its entirety.

U.S. Pat. No. 11,127,013 granted Sep. 21, 2021, "System and Method for Disambiguated Biometric Identification by Daniel Boyd, incorporated by reference in its entirety.

U.S. Patent Application No. 20220383438 published filed Feb. 3, 2022, "Systems and Methods for Identifying a Mobile Device of an Individual" by Arun Vemury, incorporated by reference in its entirety.

U.S. Pat. No. 11,902,416 granted Feb. 24, 2013, "Third Party Biometric Homomorphic Encryption Matching for Privacy Protection" by Arun Vemury, incorporated by reference in its entirety.

U.S. Pat. No. 11,727,100 granted Aug. 15, 2023, "Biometric Identification Using Homomorphic Primary Matching with Failover Non-Encrypted Exception Handling" by Arun Vemury, incorporated by reference in its entirety.

U.S. Pat. No. 11,850,878 granted Dec. 26, 2023, "Offset Printing of Security Symbols on a Substrate" by Joel Zlotnick, incorporated by reference in its entirety.

U.S. patent application Ser. No. 18/616,814 filed Mar. 26, 2024, "System and Method for Allocation of Resources" by William Hastings, incorporated by reference in its entirety.

U.S. patent application Ser. No. 18/733,505 filed Jun. 4, 2024, "Zero Knowledge Cryptographic Hash Identity Validation" by William Hastings incorporated by reference in its entirety.

U.S. patent application Ser. No. 18/738,428 filed Jun. 10, 2024, "System and Method for Generating a High Fidelity Model of a Cyber Physical Human System" by Sean Warnick, incorporated by reference in its entirety.

U.S. Patent Application Publication No. 20060055512 to Chew, which discloses methods and system for monitoring people, incorporated by reference in its entirety.

U.S. Patent Application Publication No. 20140313007 to Harding, which discloses systems and methods for conditional and situational biometric authentication and enrollment, incorporated by reference in its entirety.

U.S. Patent Application Publication No. 20030055689 to Block et al, which discloses a biometric access control device connected to electronic gate in an airport concourse, incorporated by reference in its entirety. The patent application publication discloses providing perimeter security in an airport using cameras.

U.S. Patent Application Publication No. 20050167484 to Sussman, which discloses systems and method issuing an electronic visa, incorporated by reference in its entirety.

U.S. Patent Application Publication No. 20140363058 to Emmet, which discloses systems and methods for biographic and biometric authentication, incorporated by reference in its entirety.

U.S. patent Ser. No. 10/467,604 to Dorsch, which discloses a smart ATM (automatic teller machine) configured use a GPS receiver to geolocation position data and a mobile device to collect biometric information, incorporated by reference in its entirety.

U.S. Pat. No. 8,942,436 to Mori which discloses an image processing device, imaging device, image processing method, incorporated by reference in its entirety.

U.S. Pat. No. 7,817,826 to Chen which discloses an apparatus and method for partial component facial recognition, incorporated by reference in its entirety.

U.S. Pat. No. 9,471,831 to Kim which discloses, an apparatus and method for face recognition, incorporated by reference in its entirety.

U.S. Pat. No. 9,117,109 to Nechyba which discloses, an algorithm for computing image dissimilarity, incorporated by reference in its entirety.

U.S. Pat. No. 8,538,141 to Sakimura which discloses, Classifier learning image production program, method, and system, incorporated by reference in its entirety.

The following non-patent literature is provided for background information and is incorporated by reference in its entirety.

M. Ferrara, A. Franco, and D. Maltoni, "The magic passport," in Proc. IEEE International Joint Conference on Biometrics (IJCB), September/October 2014, pp. 1-7, incorporated by reference in its entirety.

M. Ngan, P. Grother, and K. Hanaoka, "Performance of automated facial morph detection and morph resistant face recognition algorithms," National Institute of Standards and Technology, Gaithersburg, MD, Technical Report, 2023, incorporated by reference in its entirety. pages.nist.gov/frvt/reports/morph/frvt_morph_report.pdf K. Raja, M. Ferrara, A. Francot, L. Spreeuwerst, L. Batskos, F. de Wit, et al, "Morphing attack detection-database, evaluation platform and benchmarking." arxiv.org/pdf/2006.06458.pdf Venkatesh, Sushma & Zhang, Haoyu & Raghavendra, R. & B. Raja, Kiran & Damer, Naser & Busch, Christoph. (2020). Can GAN Generated Morphs Threaten Face Recognition Systems Equally as Landmark Based Morphs?-Vulnerability and Detection. 10.1109/IWBF49977.2020.9107970.

Tom Neubert, Christian Kraetzer, and Jana Dittmann. 2019. "A Face Morphing Detection Concept with a Frequency and a Spatial Domain Feature Space for Images on eMRTD." In ACM Information Hiding and Multimedia Security Workshop (IH&MMSec '19), Jul. 3-5, 2019. ACM, Paris, France, 6 pages. [Online]. doi.org/10.1145/3335203.3335721

U. Scherhag, C. Rathgeb, J. Merkel, R. Breithaupt, and C. Busch, "Face Recognition Systems Under Morphing Attacks: A Survey." IEEE Access, 2019. German Federal Ministry of Education and Research, FACE-TRUST project.

SUMMARY

Aspects of the present invention relate to machines, systems, and methods for detecting a morphed image on an ID card associated with a user. A first configuration may comprise a morphed image detection logic comprising an image similarity logic configured to generate a first similarity profile of images captured of a user. An image logic can analyze the first similarity profile to determine if any images have a similarity scores below a threshold value. Such a determination by the image logic may indicate that the image is possibly a morphed image. The image logic may flag one of the image as being a morphed image. The morphed image detection logic may instruct an access control device to shift into or remain in an access denied position if the image logic has determined on of the images is likely a morphed image.

The system may comprise a first security kiosk configured to: scan a first facial image on the ID card at a first time and a first location to capture a first card image; obtain biographic information about the user from the ID card; and store the biographic information in a database of card records. The system may comprise a second security kiosk configured to: scan the first facial image on the ID card at a second time and a second location to capture a second card image; obtain biographic information about the user from the ID card; and store the biographic information in a database of card records. The system may comprise a third security kiosk configured to: scan the first facial image on the ID card at a third time and a third location to capture a third card image; obtain biographic information about the user from the ID card; and store the biographic information in a database of card records. The system may comprise an $N^{th}$ security kiosk configured to: scan the first facial image on the ID card at an $N^{th}$ time and an $N^{th}$ location to capture an $N^{th}$ card image; obtain biographic information about the user from the ID card; and store the biographic information in a database of card records. The system may comprise a user database connected to the first-N card scanners; the user database configured to store the card images.

The system may comprise a first camera configured to capture a first surveillance facial image of the user at a fourth time and fourth location; a second camera configured to capture a second surveillance facial image of the user at a fifth time and a fifth location; a third camera configured to capture a third surveillance facial image of the user at a sixth time and a sixth location; and an $N^{th}$ camera configured to capture an $N^{th}$ surveillance facial image of the user at an $N^{th}$ time and an $N^{th}$ location. The system may comprise a surveillance database 70 connected to the first-N card scanners; the surveillance database configured to store the card images.

The system may comprise a surveillance logic configured to: determine a surveillance similarity profile of a set of surveillance first-N facial images; the surveillance similarity profile formed from the images collected from the cameras; the surveillance similarity profile including a relative similarity value of a selected image as compared to N−1 surveillance images; identify a first surveillance image from the set of first-N facial images that does not have a similarity score above a similarity threshold value; and flag the first surveillance image as a morphed image. The system may comprise a surveillance logic configured to determine a surveillance dissimilarity profile of a set of surveillance first-N facial images formed from the images collected from the cameras; the surveillance dissimilarity profile including a relative dissimilarity value of a selected image as compared to N−1 surveillance images; identify a second surveillance image from the set of first-N facial images that has a dissimilarity score above a threshold value; and flag the second surveillance image as a morphed image.

The system may comprise a user identification logic configured to: compare a plurality of card images scanned within a preset time period against the first flagged surveillance image or second flagged surveillance image; generate a similarity score for the card images and the first flagged surveillance image or second flagged surveillance image; select one or more card images having a similarity score above an identification threshold value; identify one or more ID cards associated with the one or more selected card images; obtain the biographic information about the user associated with the one or more identified ID cards from the database of card records; identify the user associated with the biographic information; and send a message to a system operator; the message containing a designation that the user has been flagged for using a morphed image, a copy of the user's facial image from the ID card, and at least some of the biographic information of the user.

In some cases, the identified card images may be the same image. For example, the first and second identified card image may be the same image. Or, the first and second identified surveillance image may be the same image. A first time may include a specific date and time. The first time and third time have the same time and date values.

The system may be configured to: identify an image on an ID card as a morphed image; identify the user that presented the ID card as a valid form of identification; identify additional users bearing a resemblance to the morphed image on the ID card; and restrict access to a secure device, container, or location via an access control device.

The user database and the surveillance database may be hosted on individual, separate servers configured to run their own database management software. The user identification logic may be configured to compare all the card images scanned within the preset time period against the first flagged surveillance image or second flagged surveillance image. The access control logic may be configured to direct an access control device to grant access or deny access to a secure device, container or location. a detainment function upon receipt of a detainment command. The access control device may be an electromechanical device that physically blocks or physically restricts movement of the user.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 16 shows a morphed image in a passport.

FIG. 17 shows a morph detection dissimilarity detection algorithm.

FIG. 18 shows an example of a morphed image generated by Face_Morpher.

FIG. 19 shows an example of a morphed image generated by Open CV.

FIG. 20 shows an example of a morphed image generated by StyleGan2.

FIG. 21 shows an example of a morphed image generated by Face Blend.

FIG. 29 shows additional images generated by a sample online forensic tool.

DETAILED DESCRIPTION

Figure 1:
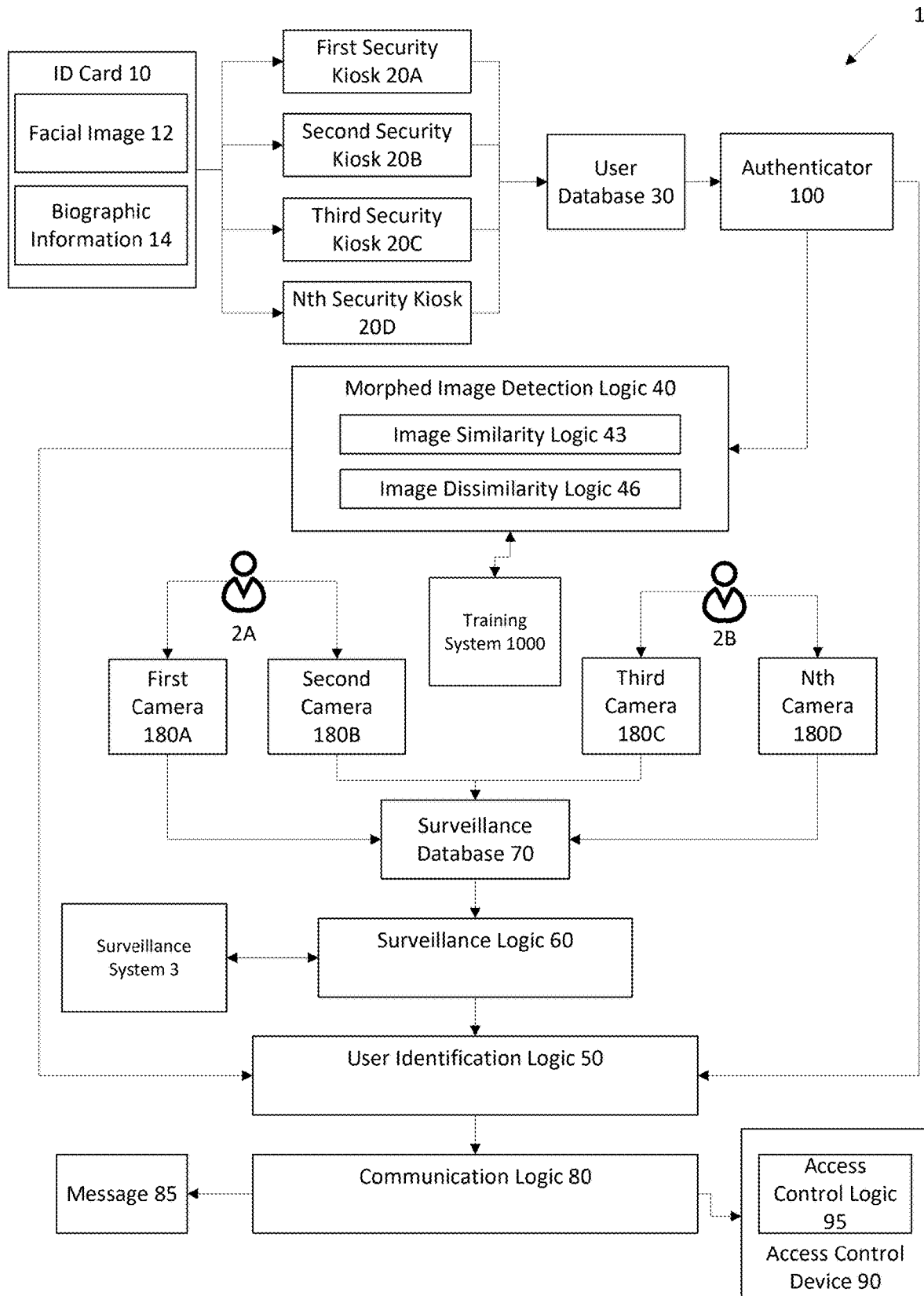
FIG. 1 is a schematic diagram of a system for detecting a morphed image on an ID card associated with a user.

FIG. 1 illustrates a security system 1 for detecting a morphed image on an ID card 10 associated with a user. In some configurations, a user may present an ID card 10. The ID card 10 may comprise card stock, one or more printed surfaces, a picture, biographic information, biometric information, an EMV chip, and security measures. An ID card can be a driver's license, passport, military ID, employee ID, etc. The card stock may be paper, plastic, or other appropriate materials. The ID card may comprise security information and/or travel information. The picture 12 may be a headshot, facial image, picture of person's face, face and shoulders, entire front view of a person, etc. Other biometric information may include fingerprints, retina scans, DNA information, etc. Biographic information 14 may include fields and data such as first name, last name, phone number, email address, DOB, mailing address, location of birth, etc. Security information may include a password, pin code, ID number, or a unique identifier such as a driver's license number. Travel information may include information associated with travelling such as date of departure, airport, flight number, port, driving directions, etc. Security measures may include microprinting, holograms, specially colored ink, and other devices to make replicating fake ID cards more difficult. Additional examples of security measures (anticounterfeiting technology) are set forth in U.S. Pat. No. 11,850,878.

The system may be configured to use various types of media files and sources of images. Media sources may include digital camera original, post processed images, printed and scanned images, gate (access control device) images, images stored on a chip of the ID card. A digital camera original may be a point and shoot camera, smart phone camera, or SLR camera. Post processed images may include cropping, contrasting, white balancing, etc. Printed and scanned images can be printed in various dimensions such as 2 inches by 2 inches. Gate images can be captured live (while the user is moving or interacting with an access control device). Chips may include compressed face images stored on e-MRTD (machine readable travel documents) or mDL (mobile driver's license).

The system may comprise a plurality of security kiosks. A security kiosk may comprise an ID card scanner, a camera, keyboard, visual display (like an LCD panel), retina scanner, fingerprint scanner, PIN pad, etc. A security kiosk may be configured to capture biographic information from a user, biometric information from a user, and PIN code from a user.

The security kiosk may be configured to read a chip on the ID card 10, scan the ID card 10 optically and use optical character recognition to interpret information on the card (or the user database may perform OCR processing), read a barcode or QR code on the card, etc. In some configurations, the security kiosk is configured to take a picture of the card and transmit the picture (e.g., the card image) to the user database 30. The security kiosk may capture and transmit the biometric information, biographic information, and facial image as a single card image or separate images. The security kiosk may package a plurality of images in a multiple image format such as a PDF file.

FIG. 1 shows a first security kiosk 20A, a second security kiosk 20B, a third security kiosk 20C, and an $N^{th}$ security kiosk 20D. N means there could be any number of additional scanners. So, in FIG. 1 there are 1 . . . N security kiosks. A large airport may comprise hundreds of security kiosks.

The security kiosk may comprise a processor, memory, data storage, a camera, chip scanner, barcode reader, and transceiver to send and receive information from the user database or other system components. The memory may comprise instructions in the form computer non-transitory computer readable code configured to cause the processor (such as a microprocessor) to perform a sequence of instructions. The security kiosk may comprise a keyboard or speech recognition logic configured to obtain biographic information from other sources other the ID card itself.

The user database may comprise a database management system configured to store, locate, delete, modify, sort, and manage card records. In some configuration, the user database may store card image, facial image from ID cards, biographic information from ID cards, biometric information from ID cards, and travel information from ID cards. The user database may comprise a server comprising a processor, memory, data storage, a camera, chip scanner, barcode reader, and transceiver to send and receive information from the user database or other system components. The memory may comprise instructions in the form computer non-transitory computer readable code configured to cause the processor (such as a microprocessor) to perform a sequence of instructions.

The system may comprise N cameras (a first camera 190A, second camera 190B, third camera 190C, $N^{th}$ camera 190D, etc.) The cameras may be surveillance cameras mounted in a building, attached to furniture, or attached to equipment (like a turnstile). The N cameras may be configured to capture images/facial images of the users that pass within a field of view of the N Cameras. The N cameras may be configured to store metadata with the image such as camera number, time, date, location, etc. The cameras may comprise a lens, optical sensors, power supply, and optical transceiver configured to send and receive instructions, information, and/or and images to a surveillance database 70. In FIG. 1, a first user 110A passes within the field of view of the first camera and the second camera. Also, a second user 110B passes within the field of view of the third camera and the Nth camera. However, a given user could pass within the field of view of M cameras (wherein M is a positive integer (0, 1, 4, 9, etc.))

Various types of cameras may be used such as digital camera which may be used for original photos. The digital cameras may be point and shoot consumer grade devices. The system may create post processed images featuring cropping, hue, and contrast adjustments. Images may be printed. Gates may capture images through live capture and other acquisition systems. Images may be stored on a chip on the ID card. The ID card may comprise a compressed face images stored on e-MRTD or mDL.

The surveillance database 70 may comprise a database management system configured to store, locate, delete, modify, sort, and manage card records. The surveillance database 70 may comprise a server comprising a processor, memory, data storage, a camera, chip scanner, barcode reader, and transceiver to send and receive information from the user database or other system components. The memory may comprise instructions in the form computer non-transitory computer readable code configured to cause the processor (such as a microprocessor) to perform a sequence of instructions. In some configurations, a single server may comprise both the surveillance database 70 and the user database 30. Or, in other configurations, the surveillance database 70 and user database 30 may be hosted on separate, distinct servers each having their own database management system.

User identification logic 50 may be configured to request information from the morphed image detection logic 40 and/or the user database 30. Communication logic 80 may be configured to send a message 85 to an operator and/or send a detainment command to an access control device 90. The morphed image detection logic 40 may comprise image similarity logic 43 for generating an image similarity profile (see FIG. 9). The morphed image detection logic may comprise image dissimilarity logic 46 for generating an image dissimilarity profile (see FIG. 9).

The security system 1 may comprise a training system configured to train or determine parameters for one or more algorithms executed by the morphed image detection logic. The system may comprise a surveillance system 3 configured to identify and possibly detained a user using an ID card with a morphed image.

Figure 2:
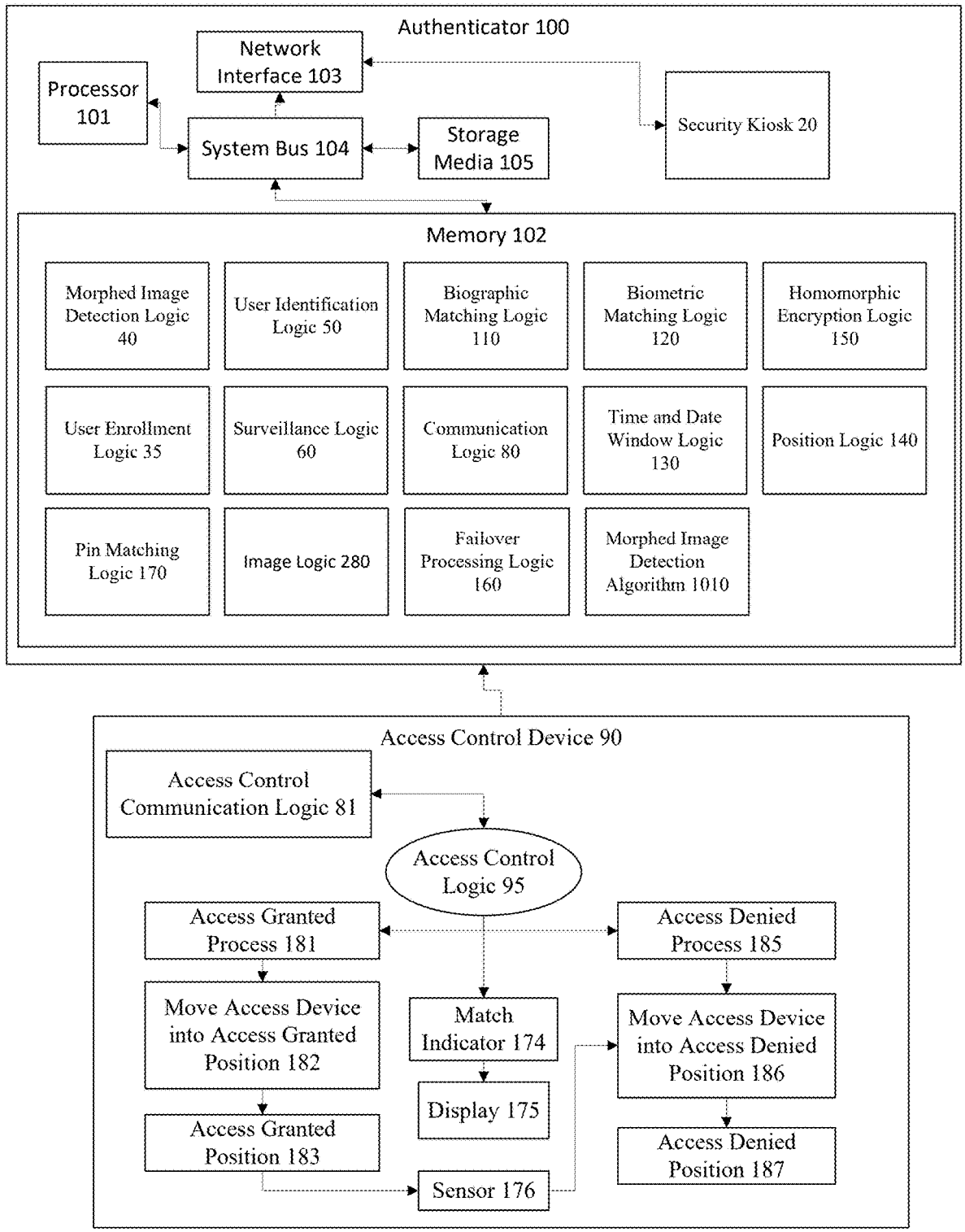
FIG. 2 is a schematic diagram of the authenticator and access control device.

FIG. 2, the security kiosk 20 may be connected to or be a part of an authenticator 100 which performs an authentication process. As part of the authentication process, the user may present an ID card to a card scanner and/or biometric information (facial image, iris scan, thumb print, blood sample) to a biometric data collector (e.g., a camera, scanner, etc.) The authenticator 200 may comprise biographic matching logic 110 configured to match biographic information captured from the ID card against a user record in the user database. The security system may comprise biographic matching logic and biographic collection devices such as described in U.S. Pat. Nos. 12,073,482; 11,127,013; 11,727,100 11,902,416 and U.S. Patent Application Publication No. 20140363058 and 20050167484 may be used for example. The authenticator 100 may comprise biometric matching logic 120 configured to match biometric information captured from the ID card against the user record in the user database. The security system may comprise biometric matching logic and biometric collection devices such as described in U.S. Pat. Nos. 11,902,416, 11,727,100, 10,467, 604 and U.S. Patent Application Publication No. 20060055512, 20140313007, 20030055689, 20050167484, and 20140363058. The authenticator may be configured to authenticate a user only at select times (such as a time and date window logic 130) or select locations using GPS (position logic 140). The security system may comprise time and window logic and position logic such as described in U.S. Patent Application No.'s 20220383438 and U.S. patent Ser. No. 10/467,604 The authenticator may utilize homomorphic encryption logic 150 and failover processing logic 160 such as described in U.S. Pat. No. 11,902,416 and 11,727,100. The authenticator may also comprise an image logic 200 configured to determine whether ID card comprises or likely comprises a morphed image. A value for "likely comprises a morphed image," "likely is a morphed image," "likely being a morphed image," etc. may be a value greater than or equal to 50%, 60%, 70%, 80%, 90%, or another designated value greater than 50%.

FIGS. 1 and 2 show a plurality of devices labelled as "logic" such as morphed image detection logic 40; image similarity logic 43, surveillance logic 60, user identification logic 50, communication logic 80, and access control logic 95. A logic may comprise a comprise a processor, circuit, memory, data storage, power supply, housing, system bus, and transceiver. The memory may comprise instructions in the form computer non-transitory computer readable code configured to cause the processor (such as a microprocessor) to perform a sequence of instructions, mathematical operations, comparisons, etc. The various logics described may be a subcomponent of single computer or server. In other configurations various computers can house separate logic components. As an example, FIG. 1 shows that an access control device 90 comprises the access control logic 95, which may take the form of a circuit. The user database 30 may be configured to send and receive information from the morphed image detection logic, surveillance database, user identification logic, and/or message logic. For example, the morphed image detection logic may be embodied as a specially programmed computer comprising a processor, computer readable media, memory, a network interface, and computer code non-transitorily stored in the memory executable by the processor to cause the processor to execute an algorithm or series of steps.

The authenticator may be embodied as a specially programmed computer comprising a processor 101, memory 102, network interface 103, system bus 104, and storage media 105. The special programming—such as the biographic matching logic 110, biometric matching logic 120, time and date window logic 130, position logic 140, homomorphic encryption logic 150, failover processing logic 160, pin matching logic 170, morphed image detection logic 40, surveillance logic 60, user identification logic 50, communication logic 80, and access control logic 95 (collectively the "logics")—may take the form of a circuit or they may take the form of non-transitory computer code stored in tangible computer readable memory and/or storage media. The processor, such as a microprocessor, may be configured to execute these logics. Any of the logics may comprise their own specially programmed computer. In some configurations, a single processor executes the logics. The authenticator may comprise the user database 30 and surveillance database 70 or it may be connected to separate machines (servers) that operate the databases (such as a cloud-based database).

FIG. 2, an access control device 90 can be an electromechanical device configured to restrict or block movement of a person moving through (attempting to move through) or into a restricted area. The access control device 90 may comprise an internal computer or may be a part of the authenticator 100. The access control device may be connected to the authenticator 100 and capable of sending and receiving information to the computer. In an example wherein the access control device contains an ID card reader, the access control device may communicate biographic or biometric information to the authenticator 100 or internal computer.

The access control device 90 may comprise an access control communication logic 81. The access control communication logic 81 may share similar function, structure, circuitry, and algorithms as described with reference to communication logic 80. The access control device may be a physical barrier, such as an electronic gate or an electronic door. It could be an electronic lock for a hatch. It can be a turn-style. The access control device can control access to a secure container. The access control device may also control access to a computing device (e.g., a server, laptop, mobile device, kiosk, etc.), a computerized machine (CT scanner, Heating, Ventilation, and Air Conditioning (HVAC) control panel, etc.) or a vehicle (tractor, ship, jet airplane, etc.). In such an embodiment, the access control device acts like a key or login to grant or deny access to use the computing device, computerized machine, or vehicle. The access control device may comprise a power supply to provide power to the computer and/or electromechanical devices.

The access control device may include biometric capture technology, e.g., a fingerprint scanner, a facial image capture device, camera, etc. The access control device can comprise a security kiosk 20. The authenticator may be configured to transmit a message 85 to the access control device 90.

The authenticator may comprise and access granted process 181 to grant access to the user by sending an instruction to the access control logic to move/adjust 182 the access control device into an open position, on position, or unlocked position ("access granted position") 183. The access control device may comprise an access control logic 95 configured to execute an access granted process 181 comprising a series of steps the access control device performs when switching 182 into the access granted position 183. For example, the access control device may cause a door to unlock, a gate to open, a barrier to lower into the ground, brakes in a car to disengage, access to a laptop to be granted, access to adjust settings in HVAC panel to be granted, etc.

The access control device may feature a lockdown mode wherein the device will remain in an access denied position even if the communication logic sends an instruction to open the access control device. This feature may be used for fires, hostage situations, or anything the system operator wants to restrict access to such as a location, device, or container.

The authenticator 100 may comprise an access denied process 185 to deny access to the user by sending an instruction to the access control logic to move/adjust 186 the access control device into a closed position, off position, or locked position ("access denied position") 186. The access control logic 95 may execute an access denied process 185 comprising a series a steps the access control device performs when moving or switching 186 into access denied position 187. For example, the access control device may cause a door to lock, a gate to close, a barrier to raise above the ground, brakes in a car to engage, access to a laptop to be locked, access to adjust settings in HVAC panel to be disabled, etc.

FIG. 2, the access control device may comprise an access display 175 configured to display a message to the user whether he or she has been granted access or denied access. This display may show a positive or negative match indicator 174 (e.g., Go or Stop). The message may be color coded; green is for go, red is for stop, etc. The access control device may have a default position (e.g., access granted or access denied). The access control device may revert to the default position after a preset amount of time or after a user passes through the device (e.g. 30 seconds, 1 minute, 10 minutes, etc). The access control device may comprise a sensor 176 configured to determine whether the user has passed through or within a predetermined radius of the access control device.

The communication logic may be configured to send a signal to an access control device comprising: instructions to shift the access control device into an access granted position if the morphed image detection logic has flagged the ID card as not comprising a morphed image; and instructions to shift the access control device into an access denied position if the morphed image detection logic has flagged the ID card as comprising a morphed image. If the access control device receives an open command from the authenticator or communication logic (etc.), the access control device may shift from the access denied position to the access granted position (e.g., a closed position or locked position into an opened or unlocked position.) For example, the access control device may lock or seal a door, gate, or hatch.

Figure 3:
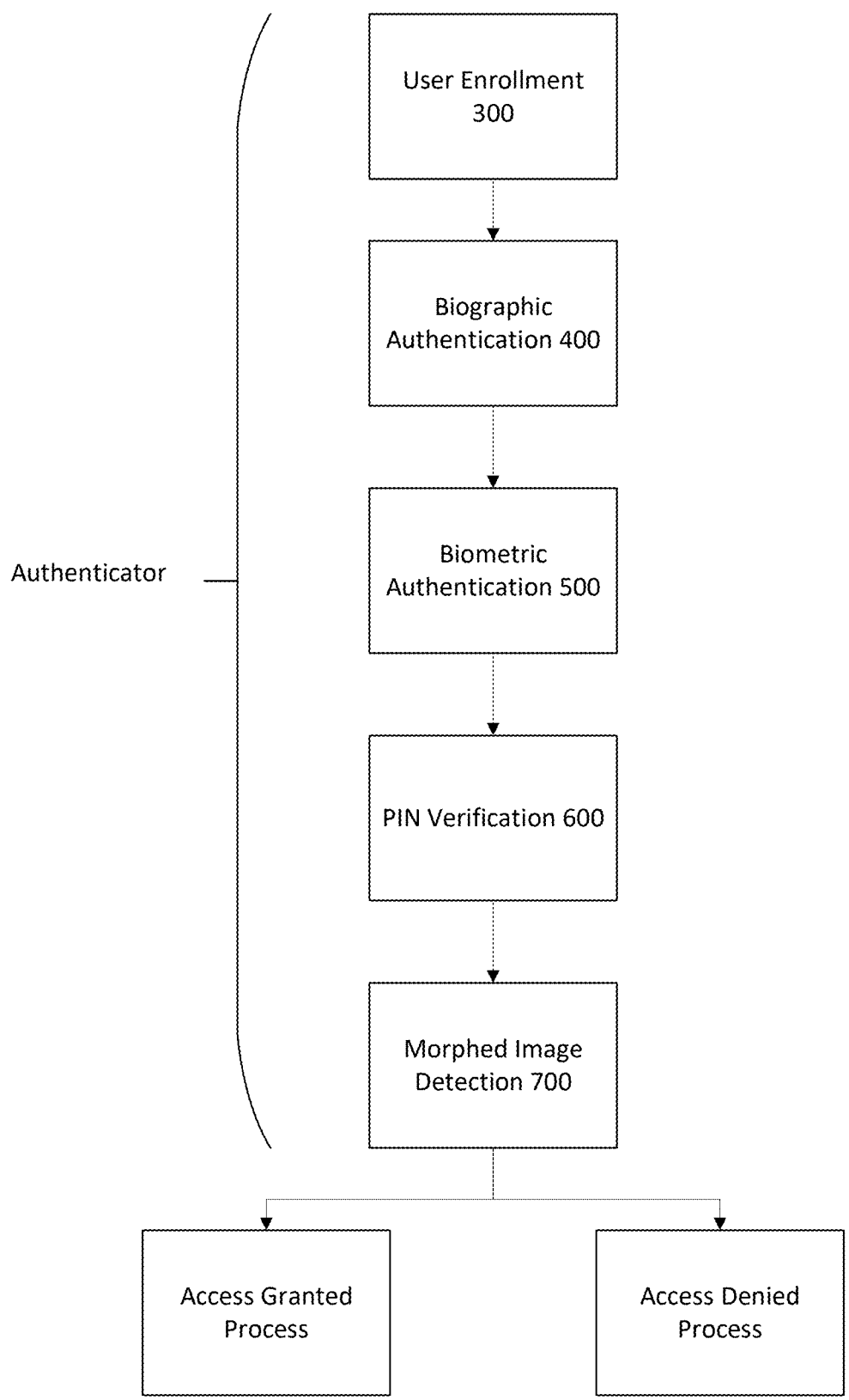
FIG. 3 is a flow chart of processes the authenticator may execute when determining whether to instruct the access control device to grant or deny access to the user.

FIG. 3, the security system may execute a process of user enrollment 300, biographic authentication 400, biometric authentication 500, PIN verification 600, morphed image detection 700, and execution of an access granted process 181 or access denied process 185. Biographic authentication 400, biometric authentication 500, PIN verification 600, and morphed image detection 700 are collectively referred to as authentication processes. These processes may be performed in different orders or sequences. An authentication process may be repeated or omitted depending on the configuration. For example, the authenticator 100 may repeat the biometric authentication process 500 if the collected biometric information does not match the biometric reference data. The authenticator 100 may repeat the user enrollment process 300 to update user records 32.

A user record may comprise various types of information about the user such as biographic reference data 36, biometric reference data 37, PIN reference data 38, an image gallery 41, an image similarity profile 210, and image dissimilarity profile 240. The security system may be configured to capture multiple images of the user over time and store them in the image gallery (populate the image gallery.) For example, the surveillance logic may be configured to capture surveillance images of the user using security cameras 180A-180D and store the surveillance images in the image gallery. The surveillance logic may be configured to perform image processing on a captured image. For example, the surveillance logic may comprise software or an algorithm configured to adjust resolution, white balance, contrast, etc. The surveillance logic may also be configured to adjust cameras settings to improve image quality of the images for facial recognition and comparison.

The morphed image detection logic 40 may be configured to generate similarity scores for the image similarity profile 210 and dissimilarity scores for the image dissimilarity profile 240. An image similarity profile 210 may comprise a plurality of similarity scores. A similarity score may be measurement of how similar a first image is to a second image. An image may comprise multiple associated image similarity scores. For example, a first image may comprise N similarity scores, each similarity score comparing a similarity of the first image to the $N^{th}$ images in the image gallery 41 for the user. An image dissimilarity profile 240 may comprise a plurality of dissimilarity scores. A dissimilarity score may be measurement of how dissimilar a first image is to a second image. An image may comprise multiple associated image dissimilarity scores. For example, a first image may comprise N dissimilarity scores, each dissimilarity score comparing a dissimilarity of the first image to the $N^{th}$ image in the image gallery 41 for the user.

The security system 1 may execute the biographic authentication process 400 and biometric authentication process 500 each time a user attempts to access a secure area by way of the access control device 90, but the security system 1 may only execute the morphed image detection process 20% of the time (e.g., to save computing resources) for example. Some configurations might not use a PIN verification process, etc.

The security system 1 may not necessarily be configured to execute all five of these processes. One or more processes may be omitted (e.g., no PIN verification.) A user enrollment logic 35 may execute the user enrollment process 300. The user enrollment process 300 may include collecting and storing reference biographic data, biometric data, and/or a PIN code. The security kiosk 20 may collect biographic information from the user and biographic matching logic may compare the collected biographic information against reference biographic data from the user database. The security kiosk may collect biometric information from the user and the biometric matching logic may compare the collected biometric information against reference biometric information from the user database. The security kiosk 20 may be configured to collect a PIN from the user and PIN verification logic may verify the collected PIN matches a reference PIN previously associated with that user. Morphed image detection logic 40 may determine whether a presented ID card comprises or likely comprises a morphed image. The biographic matching logic 110, biometric matching logic 120, PIN verification logic 610, and image logic 280 may be connected via communication logic to an access control device. The authenticator 100 may be configured to send a communication to the access control device to execute an access denied process or access granted process based on outputs or results generated by the biographic matching logic, biometric matching logic, PIN verification logic, and/or image logic. Information captured by security kiosk and stored in the user database 30 may be encrypted. The biographic matching logic may compare encrypted and hashed data values of the collected biographic information to reference biographic data. The biometric matching logic may compare encrypted and hashed data values of the collected biometric information to reference biometric data. The PIN verification logic may compare encrypted and hashed data values of the collected PIN code to the reference PIN code. The image logic 280 may compare encrypted and hashed data values of the collected biometric information to reference biometric data.

Figure 4:
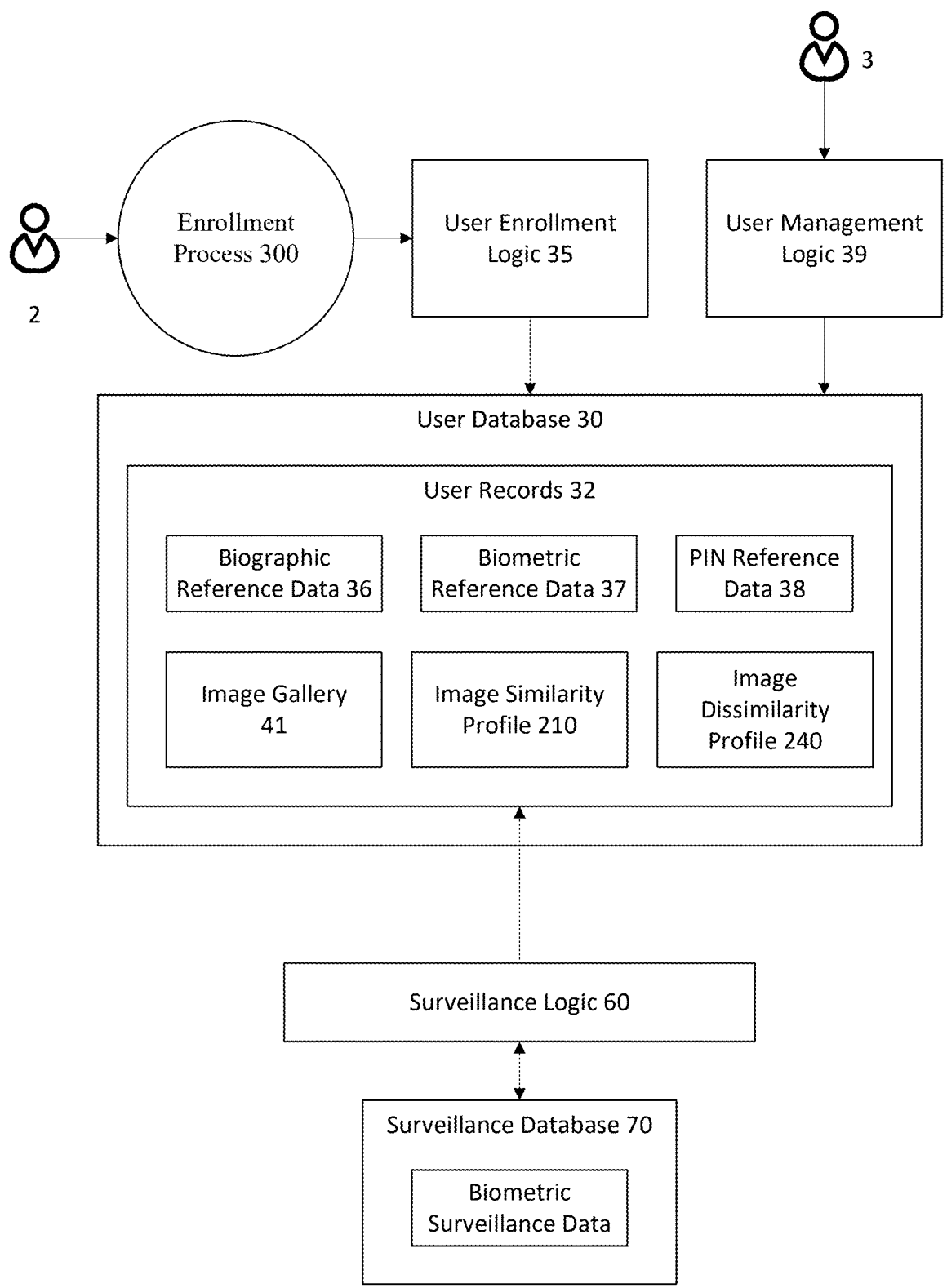
FIG. 4 is a process flow for user enrollment.

FIG. 4 shows an enrollment process 300 for the security system. The security system may comprise a user enrollment logic 35 configured to obtain biographic information about the user, biometric information about the user, a PIN code, access privileges, etc. The security system 1 may comprise user management logic 39 configured to set locations and times that a user may be granted access to pass through an access control device 90. The user management logic may also set limit access through specific access control devices. For example, the security system may grant user A access to pass through a first access control device and second access control device during a specific time (T) window or specific date (D). In the same example, the security system may deny access to pass through a third access control device at time T or data D. However, the same user may be granted access to pass through the third access control device at T' or date D' (wherein T' is a different time than T and D' is a different date that D.) An operator 3 of the security system 1 may set the access privileges for the user through the user management logic 39. The user management logic may comprise a user interface configured to accept and configure access settings associated with various access control devices on a user basis. Additionally, the user management logic may comprise group policies associated with multiple users. For example, users in a specific group may pass through access control device from 9 AM-5 PM.

The security system may comprise a user database 30 configured to store information about the user, optionally from the user enrollment logic, into user records 32. The security system 1 may store the biographic information in the user database 30 as biographic reference data 36. The security system 1 may store the biometric information in the user database 30 as biometric reference data 37. The security system 1 may store a user PIN into the user database 30 as PIN reference data 38. The surveillance logic 60 may be configured to store surveillance images in the surveillance database 70 and/or user database 30. The surveillance logic 60 may be configured to transfer biometric surveillance data such as fingerprints, videos, facial pictures from surveillance database 70 to the user database 30.

Figure 5:
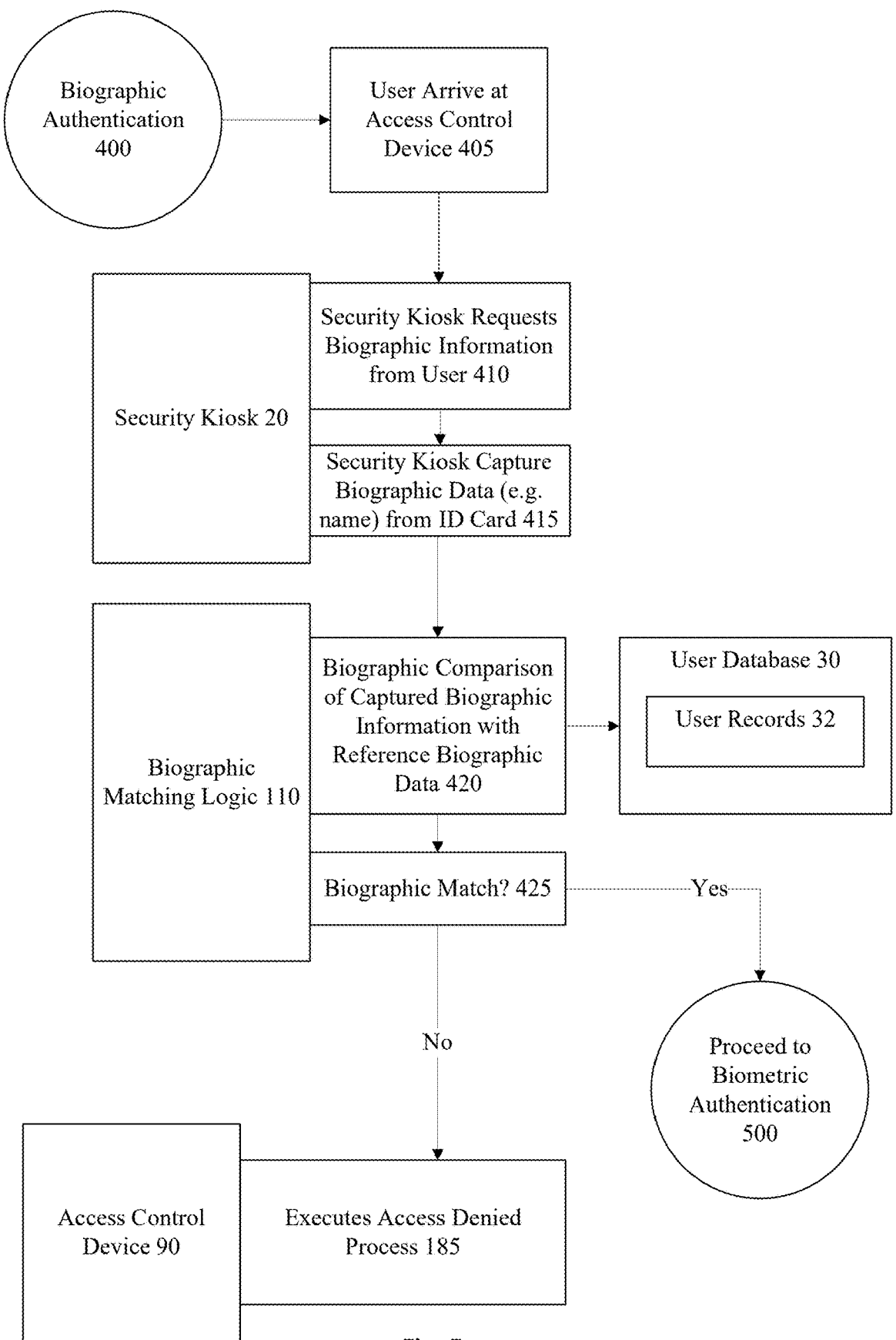
FIG. 5 is a process flow for biographic authentication.

FIG. 5 shows a process for biographic authentication 400 of the user. The user may arrive 405 at an access control device 90. The access control device 90 may comprise a sensor for determining the user is near the access control device. The sensor 176 may be an optic sensor, scale, laser, GPS, Bluetooth sensor, or other circuit designed to determine whether a user has arrived 405 at or within a specific distance of the access control device 90. The security system 1 may comprise a security kiosk 20 configured to request 410 biographic information from a user ID card 10. The security kiosk may scan or capture 415 biographic information from the ID card. The biographic matching logic 110 may be configured perform a biographic comparison of captured biographic information against the reference biographic data 420. The biographic authentication process may have a biographic match 425 comparison. The biographic matching logic may perform the biographic match comparison to determine whether the captured biographic information matches (optionally within a threshold) the reference biographic data (which may be stored in the user records 32 of the user database 30). The biographic matching algorithm used by the biographic matching logic may use stemming, fuzzy logic, and other techniques. If the biographic matching logic determines the captured biographic information matches reference biographic data (the "yes" branch) the authenticator may proceed with performing a biometric authentication 500, PIN verification, morphed image detection, or send a message to the access control device to initiate an access granted process. Because the computer resources often required for biometric matching and comparison are often greater than the computer resources for biographic matching, the authenticator 100 may be configured to perform the biometric authentication after a biographic match has been positively confirmed. A biographic match may indicate that a user matching the captured biographic information also has a record in the user database 30. The user may have a record in the user database because the user had previously submitted his or her information to the user database through the user enrollment logic and process. If the biographic matching logic determines the captured biographic information does not match reference biographic data (the "no" branch) the authenticator may instruct the access control device to execute an access denied process. The access control device 90 may configured to default to the access denied position. As a result, the "no" branch may involve not sending any signal to the access control device to shift to the access denied position. Alternatively, the "no" branch may comprise sending an explicit instruction to the access control device to shift or remain in the access denied position.

Figure 6:
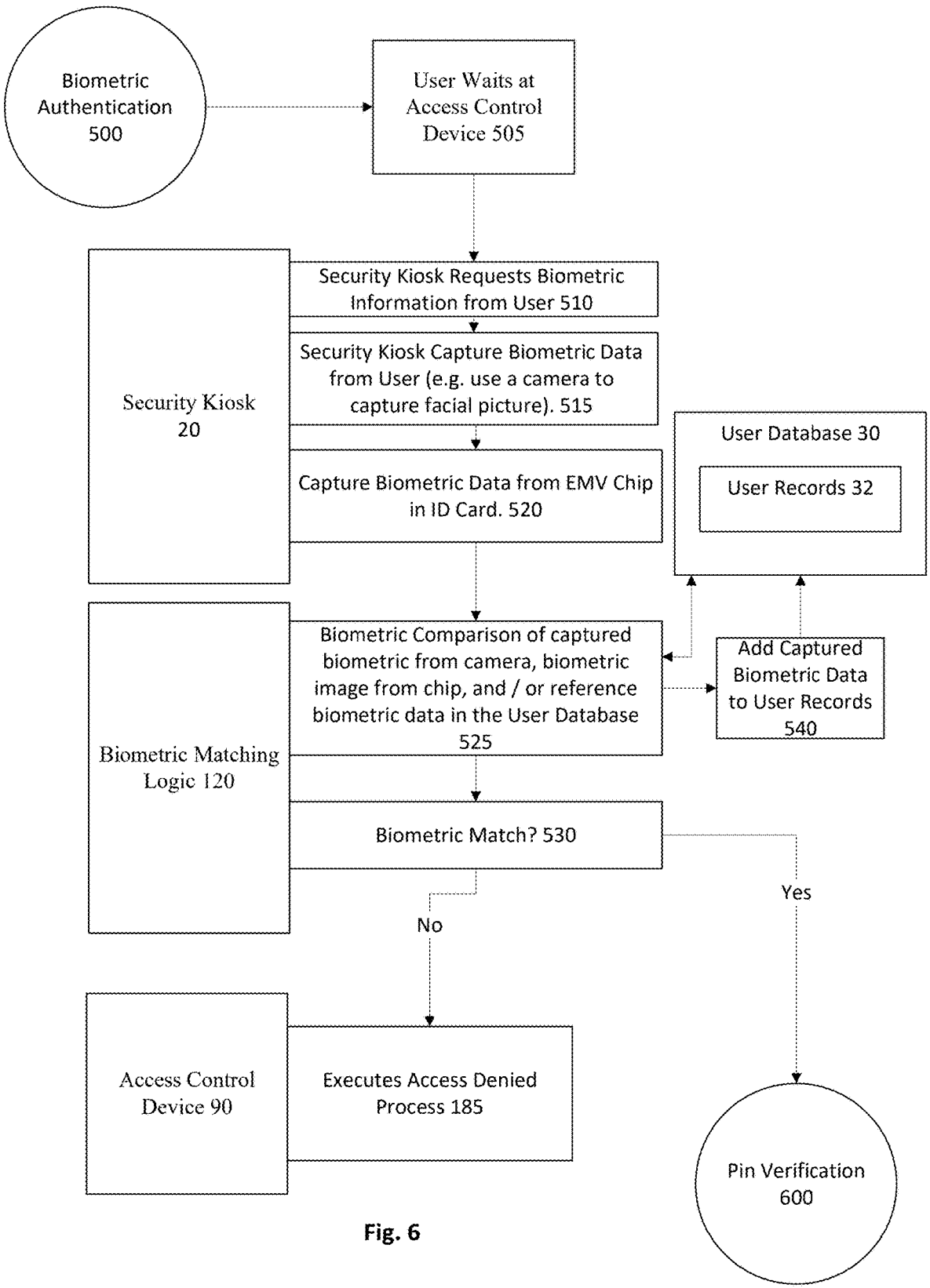
FIG. 6 is a process flow for biometric authentication.

FIG. 6 illustrates an exemplary biometric authentication process 500. As shown, the user can arrive 405 or wait at the access control device 90. The security kiosk 20 may request 510 biometric information from the user using a biometric collection device 515. The biometric collection device could be a camera, card scanner, thumb print scanner, retina scanner, DNA scanner, etc. In some configurations, the security kiosk may comprise the biometric collection device. The security kiosk may capture biometric information from the ID card by scanning a picture or accessing biometric data from an EMV chip on the ID card 520. The biometric matching logic 120 may be configured perform a biometric comparison of captured biometric information with reference biometric data 525. The biometric authentication process 500 may have a biometric match 530 comparison. The biometric matching logic 120 may perform the biometric match 530 comparison to determine whether the captured biometric information matches (optionally within a threshold) the reference biometric data (which may be stored in the user records 32 of the user database 30). If the biometric matching logic 120 determines the captured biometric information matches reference biometric data (the "yes" branch) the authenticator may proceed with performing a PIN verification, biographic authentication, or morphed image detection. A biometric match may indicate that a user matching the captured biographic information also has a record in the user database. The biometric matching logic may also utilize hashing and/or to improve matching speed and data security. For example, the security system may perform homomorphic encryption of collected biometric information and perform biometric matching against homomorphic encrypted biometric reference data to authenticate the user. Technology and algorithms for homomorphic encryption, hashing, and matching of hashed values is further explained in U.S. Patent Application No. 20220383438; U.S. Pat. Nos. 11,902,416; and 11,727,100.

The user may have a record in the user database because the user had previously submitted his or her information to the user database through the user enrollment logic and process. If the biometric matching logic determines the captured biometric information does not match reference biometric data (the "no" branch) the authenticator may instruct the access control device to execute an access denied process. The access control device 90 may configured to default to the access denied position. As a result, the "no" branch may involve not sending any signal to the access control device to shift to the access denied position. Alternatively, the "no" branch may comprise sending an explicit in instruction to the access control device to shift or remain in the access denied position.

FIG. 6 also shows a process for adding, augmenting, or updating captured biometric data to user records 540. The security system 1 may add the captured biometric data to the user records after, for example, determining a positive match for the user biographic data and PIN number. E.g., once the security system verifies the person waiting at the access control device matches the identify presented via the ID card, the security system can update the user's picture or add the user's picture to a gallery of pictures (image gallery). The user database can comprise multiple pictures of a user (an image gallery) captured by the security kiosk and/or surveillance logic. The security system may be programmed to store multiple versions of biometric reference data (e.g., multiple headshots) to improve accuracy for biometric similarity matching (e.g., as executed by the biometric matching logic) and image logic. Technology and algorithms for adding biometric data to secure system (such as the user database) from a trusted, partially trusted, and/or untrusted device (such as a user's mobile device) are further explained in in U.S. Patent Application No. 20220383438.

Figure 7:
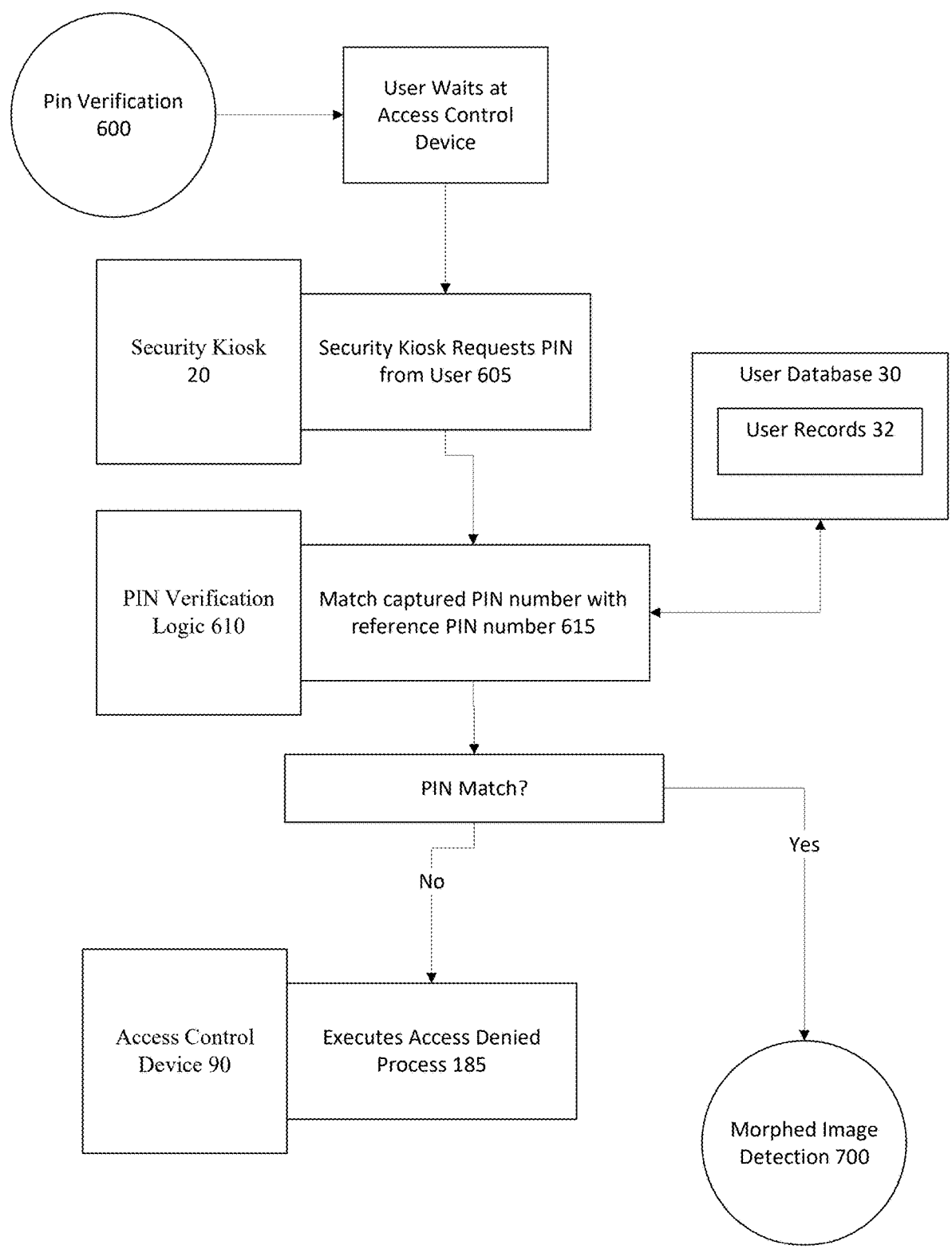
FIG. 7 is a process flow for PIN verification.

FIG. 7 shows a PIN verification process 600. The security kiosk may comprise a PIN pad or keyboard configured to receive a PIN code from the user 605. Pin verification logic 610 may be configured to match a PIN code captured by the PIN pad to a reference PIN code entered by user during the enrollment process 615. The PIN code may be associated with the user and/or stored in a user record. If there is a positive PIN match (the "yes" branch") the authenticator may proceed with an additional authentication process such as biographic authentication, biometric authentication, or morphed image detection. In some configurations, the PIN verification may be the last step the authenticator 100 completes before signaling (messaging) the access control logic to execute an access granted process. If the PIN verification logic determines the captured PIN code does not match the reference PIN code, the PIN verification logic may instruct the access control device to execute the access denied process.

Figure 8:
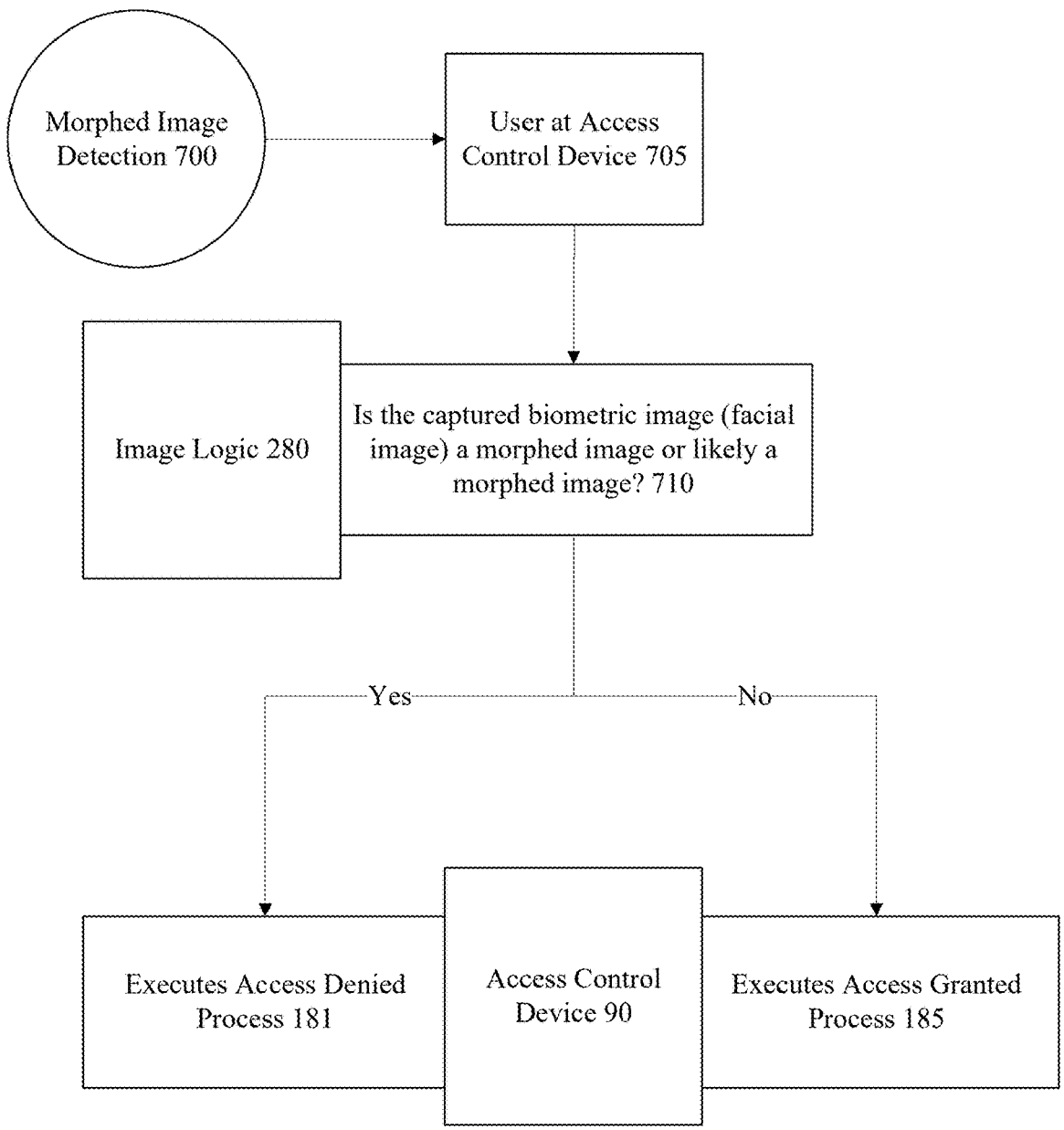
FIG. 8 is a process flow of morphed image detection.

FIG. 8 shows a morphed image detection process 700. This process is further explained in FIG. 9. The morphed image detection logic 40 may execute a morphed image detection process to determine whether the user has presented the security system 1 (or security kiosk 20) with an ID card comprising or likely comprising a morphed image 710. The image logic 280 may execute the morphed image detection process may occur while the user is waiting at an access control device 705. Examples include before the user physically passes through the access control device, before the user obtains access to secure device, before the user can open a secure container, etc. A user could present an ID card with a morphed image to the security kiosk. The image logic may signal the access control device to execute an access denied process if the image logic determines that the collected biometric information (e.g., a morphed facial image) is or is likely a morphed image. The image logic 280 may signal the access control device to execute an access granted process if the image logic determines that the collected biometric information is not or is not likely a morphed image (e.g., a false negative).

The image logic may execute the morphed image detection process 700 after the user has already passed through the access control device. In such a case, although the user would obtain access to a secure location, device, container, etc., the surveillance logic may be configured to locate and identify the user after he or she has passed through the access control device.

Figure 9:
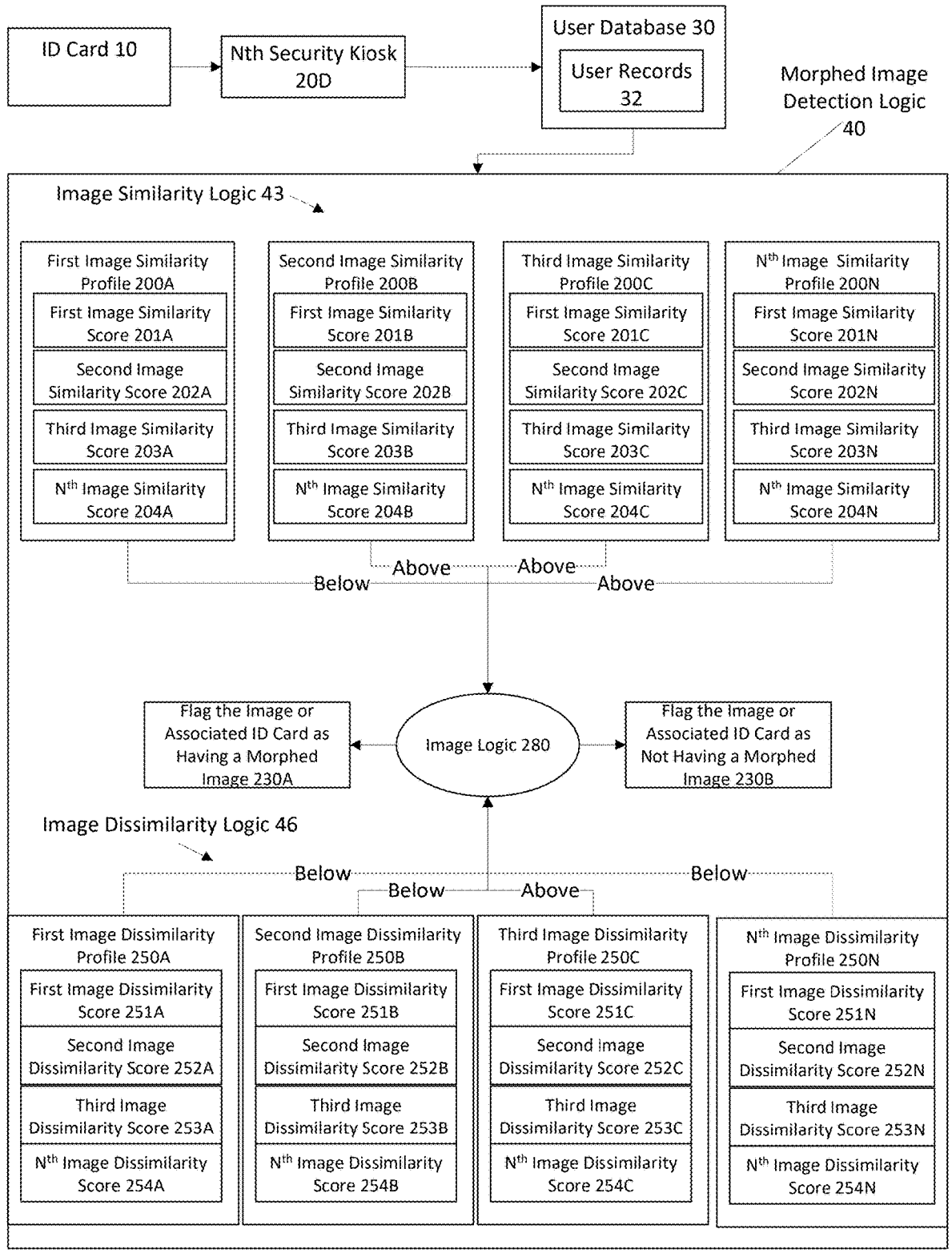
FIG. 9 is a detailed view of processes executed by the morphed image detection logic.

FIG. 9 shows a detailed view of the morphed image detection logic 40. A morphed image detection logic 40 may comprise an image similarity logic 43 and an image dissimilarity logic 46. In some configurations, the morphed image detection logic 40 may comprise either the image similarity logic or the image dissimilarity logic, but not both. The image similarity logic 43 may be configured to generate an image similarity profile 210. An image similarity profile may be a measurement of how many similar features are shared by two or more images. In the example of a facial image, features may be image elements such as skin color, eye lashes, nose dimensions, lip width, etc. The image dissimilarity logic 46 may be configured to generate an image dissimilarity profile 240. An image dissimilarity profile is a measurement of how many dissimilar features are shared by two images or more images. In the example of a face, a scar on one picture but not on the other might be dissimilarity. Other examples may include moles, lesions, wrinkles, etc. Of course, the image similarity logic may detect differences in skin color, eye lashes, nose dimension, lip width, etc. as it applies to the dissimilarity profile. Likewise, the image similarity logic may detect similarities in scars, moles, lesions, and wrinkles.

In operation, a user (2A or 2B) will likely scan or have scanned the ID card multiple times at one or more security kiosks throughout a work schedule. For example, there may be different security kiosks at different building entrances. Assuming the user hasn't attempted to the change the facial image in the ID card, the relative similarity value of a current scan when compared to one or more previous scans will be very high. However, if the user attempts to modify the facial image on the ID card, the similarity score may drop below a first threshold value. For example, if a user updates his or her card image to a newer image, but wears makeup to alter his or her appearance when getting the new picture, the image similarity logic or image logic may determine the image similarity between a current scan of the new picture of user wearing makeup (e.g., a disguise) and a scan of a previous picture would be below an image similarity threshold value (the "first threshold value"). Likewise, an image dissimilarity logic or the image logic may determine that the dissimilarity between the current image and a previous image to be above an image dissimilarity threshold value ("second threshold value.") In both cases, the morphed image detection logic via the image logic 280 may flag the card and/or associated image as a morphed image 230A.

The morphed image detection logic 40 may be configured to generate similarity scores greater or less than the first threshold value. The first threshold value may be a value set experimentally or the value may be preset by a system operator. The image logic may be programmed to identify a scan of an ID card as containing a morphed image when one or more of the similarity scores in the image similarity profile is less than the first threshold. To determine a value for the first threshold, a machine learning algorithm may be trained to determine what threshold value is high enough so that the image similarity logic determines a similarity score below the first threshold value for morphed images. (See FIG. 10 for details on the machine learning algorithm.) To detect a change to the image as a morphed image, the image logic may need to determine that the image similarity profile contains at least one similarity score below the first threshold value. The image logic may be programmed to determine that the scan of the card/image contains a morphed image when one or more images in the similarity profile has a similarity score below the first threshold value.

The morphed image detection logic 40 may be configured to generate dissimilarity scores values less than or greater than a second threshold value. The second threshold value may be a value set experimentally or the value may be preset by a system operator. The image logic may be programmed to identify a scan of an ID card as containing a morphed image when one or more of the dissimilarity scores in the image similarity profile is greater than the second threshold. To determine a value for the second threshold, a machine learning algorithm may be trained to determine what threshold value is low enough so that the image dissimilarity logic determines a dissimilarity score above the first threshold value for morphed images. To detect a change to the image as a morphed image, the image logic may need to determine that the image dissimilarity profile contains at least one dissimilarity score above the second threshold value. The image logic may be programmed to determine that the scan of the card/image contains a morphed image when one or more images in the dissimilarity profile has a dissimilarity score above the second threshold value.

The image similarity logic 43 may be configured to generate a first image similarity score 201A comprising a similarity value of the first image and the second image; generate a second image similarity score 202A comprising a similarity value of the first image and the third image; generate a third image similarity score 203A comprising a similarity value of the first image and the reference image; and generate an $N^{th}$ image similarity score 204A comprising a similarity value of the first image and the $N^{th}$ image; and generate a first image similarity profile 200A comprising the first image similarity score 201A, second image similarity score 202A, third image similarity score 203A, and $N^{th}$ similarity score 204A.

The image similarity logic 43 may be configured to generate a similarity profile for the second image (the "second image similarity profile 200B"), a similarity profile for the third image (the "third image similarity profile 200C"), and an $N^{th}$ similarity profile for the $N^{th}$ image (the "Ni image similarity profile 200N"). The second image similarity profile may comprise a first similarity score 201B comprising a similarity value of the second image and the first image; a second similarity score 202B comprising a similarity value of the second image and the third image; a third similarity score 203B comprising a similarity value of the second image and the reference image; an $N^{th}$ similarity score 204B comprising a similarity value of the second image and the $N^{th}$ image. The third image similarity profile 200C may comprise a first similarity score 201C comprising a similarity value of the third image and the second image; a second similarity score 202C comprising a similarity value of the third image and the second image; a third similarity score 203C comprising a similarity value of the second image and the reference image; and an $N^{th}$ similarity score 204C comprising a similarity value of the third image and the $N^{th}$ image. The $N^{th}$ image similarity profile may comprise a first similarity score 201N comprising a similarity value of the $N^{th}$ image and the first image; a second similarity score 202N comprising a similarity value of the $N^{th}$ image; a third similarity score 203C comprising a similarity value of the second image and the reference image; and an $N^{th}$ similarity score 204N comprising a similarity value of the $N^{th}$ and the third image.

In the example depicted in FIG. 9, the image similarity profile may comprise a $1^{st}$ similarity score below a first threshold value, a $2^{nd}$ similarity score above (greater than) the first threshold value, a $3^{rd}$ similarity score above (greater than) the first threshold value, and Ni similarity score above the first threshold value. The image logic 280 may comprise a first algorithm or circuit to flag the ID card, account, and/or associated image as comprising or likely comprising a morphed image 230A. The image logic 280 may comprise a second algorithm or circuit configured to flag the ID card, account, and/or associated image as not comprising or not likely comprising a morphed image 230A. The image logic may also be configured to flag the card and associated image as not comprising or not likely comprising a morphed image based on the similarity scores in the image similarity profile and/or dissimilarity scores in the image dissimilarity profile.

Flagging a card, image, account, or user may be a process in which a setting, value, or indicator associated with the ID card, account, and/or associated image is changed to allow the security system to identify the ID card, account, and/or associated image as a morphed image or not morphed image. The authenticator may invoke the message logic if it determines a card has a morphed image. In configurations wherein the security kiosk is integrated or connected to an access control device, the message logic may send a signal causing the access control device to execute the access denied process (e.g., to close the access control device or lock the access control device, etc.) The message logic may be configured to send a message to a security guard supervising or operating a security kiosk, law enforcement, security, and/or the user. The message may comprise information indicating an invalid scan, an invalid scan with an error, invalid scan with a biographic non-match, biometric non-match, PIN code non-match, or an invalid scan with a morphed image. A "non-match" means a comparison was run by the authenticator (e.g., the biographic matching logic) and the authenticator determined that a supplied or collected information (such as the biographic information) did not match (within a threshold) reference information (such as the reference biographic information.) The message logic can be configured to send a message to the user via a display on an access control device that the card scan was invalid, send a text message to the security guard to detain the user, and an email to a supervisor or system operator that a morphed image was detected.

The image logic may comprise a first algorithm which causes the image logic to flag the ID card, account, and/or associated image as containing a morphed image or likely comprising a morphed image if the image similarity profile comprises one or more similarity scores that are below the first threshold value. The first algorithm may also be configured to cause the image similarity logic to flag the first identified card as comprising a morphed image if the image similarity profile comprises any of the similarity scores that are below the first threshold value. The first algorithm may be configured to flag the card as not containing an image comprising or likely comprising a morphed image if the image similarity profile does not comprise one or more similarity scores that are below the first threshold value. The first algorithm may also be configured to cause the image similarity logic to flag the first identified card as not comprising a morphed image if the image similarity profile does not comprise any of the similarity scores that are below the first threshold value.

The image logic may comprise a second algorithm which causes the image logic to flag the ID card, account, and/or associated image as comprising or likely comprising a morphed image if the image dissimilarity profile comprises a majority of the similarity scores that are above the second threshold value. The second algorithm may also be configured to cause the image dissimilarity logic to flag the first identified card as comprising or likely comprising a morphed image if the image similarity profile comprises a majority of the dissimilarity scores that are above the second threshold value. The second algorithm may be configured to flag the image as not comprising or not likely comprising a morphed image if the image dissimilarity profile does not comprise a majority of the similarity scores that are above the second threshold value 230B. The second algorithm may also be configured to cause the image dissimilarity logic to flag the first identified card as not comprising or not likely comprising a morphed image if the image similarity profile does not comprise a majority of the dissimilarity scores that are above the second threshold value.

The image similarity logic 46 may be configured to generate a first image dissimilarity score 251A comprising a dissimilarity value of the first image and the second image; generate a second image dissimilarity score 252A comprising a dissimilarity value of the first image and the third image; generate an $N^{th}$ image dissimilarity score 253A comprising a dissimilarity value of the first image and the Nt image; and generate a first image dissimilarity profile 250A comprising the first image dissimilarity score 251A, second image dissimilarity score 252A, and Nt dissimilarity score 253A.

The image dissimilarity logic 46 may be configured to generate an image dissimilarity profile for the second image (the "second similarity profile 250B"), an image dissimilarity profile for the third image (the "third dissimilarity profile 250C"), and an $N^{th}$ image dissimilarity profile for the $N^{th}$ image (the "Nt dissimilarity profile 250N"). The second image similarity profile may comprise a first image dissimilarity score 251B comprising a dissimilarity value of the second image and the first image; a second dissimilarity score 252B comprising a dissimilarity value of the second image and the third image; a third image dissimilarity score 253B comprising a dissimilarity value of the second image and the reference image; and an $N^{th}$ dissimilarity score 254B comprising a similarity value of the second image and the Nt image. The third image dissimilarity profile 250C may comprise a first image dissimilarity score 251C comprising a dissimilarity value of the third image and the second image; a second dissimilarity score 252C comprising a dissimilarity value of the third image and the second image; a third image dissimilarity score 253C comprising a dissimilarity value of the second image and the reference image; and an $N^{th}$ dissimilarity score 254C comprising a dissimilarity value of the third image and the $N^{th}$ image. The $N^{th}$ image dissimilarity profile may comprise a first image dissimilarity score 251N comprising a dissimilarity value of the $N^{th}$ image and the first image; a second image dissimilarity score 252N comprising a dissimilarity value of the Ni image and the second image; a third image dissimilarity score 253N comprising a dissimilarity value of the second image and the reference image; and an $N^{th}$ image dissimilarity score 254N comprising a dissimilarity value of the $N^{th}$ and the third image.

The process described above has been explained with reference to a first ID card that can be scanned by N security kiosks. The security system 1, authenticator 200, and morphed image detection logic 40 can process a plurality of cards M. N and M are natural numbers. If the security system 1 is deployed in airport, train station, commercial building, or military base for example, the system could process thousands of cards per day. A given ID card could be scanned 5, 10 or 20 times in a given time period (e.g., per day or per week.)

Figure 10:
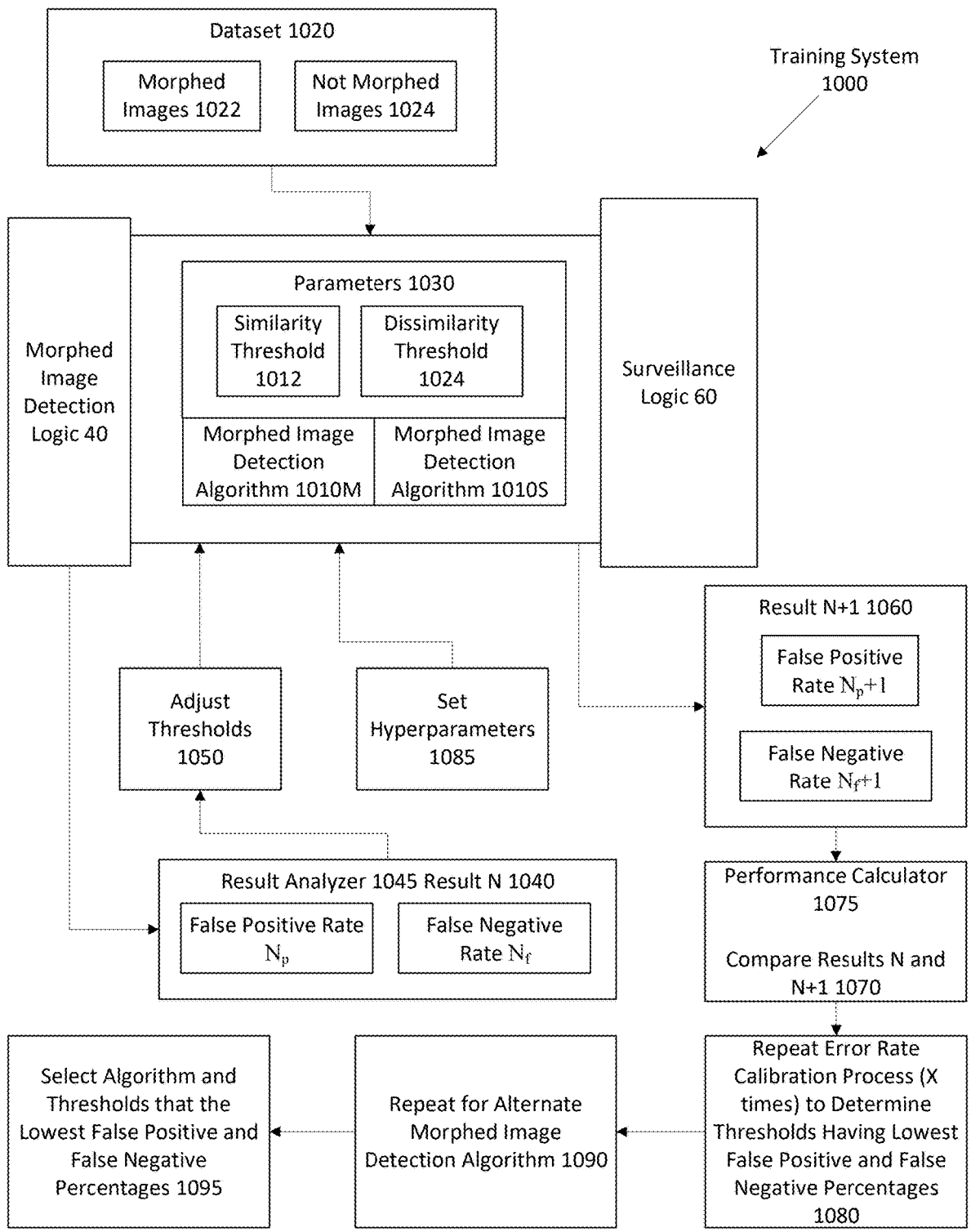
FIG. 10 is a training system for training the morphed image detection logic.

FIG. 10 illustrates an exemplary training process and training system 1000 configured to use machine learning to determine values of parameters 1030 of the morphed image detection algorithm executed by morphed image detection logic and/or surveillance logic. For example, the training system may determine values for the similarity threshold 1032 (first threshold) and dissimilarity threshold 1034 (second threshold). The morphed image detection logic may contain a morphed image detection algorithm 1010M programmed to detect morphed images. The surveillance logic 60 may contain a morphed image detection algorithm 1010S programmed to detect morphed images. These algorithms may be variants of each other, the same, or materially different. The algorithm may comprise an error rate such as a false negative rate and/or false positive rate. The security system 1 may comprise a training system 1000 for the morphed image detection algorithm that may be configured to iterate through different values (e.g. X values) for the similarity threshold and/or dissimilarity threshold in order to determine a value for the similarity threshold and/or dissimilarity threshold that generates a lowest false positive rate and false negative rate. As shown, the training system 1000 may comprise a dataset 1020 comprising dataset images for training, validation, etc. For example, the dataset may comprise morphed images 1022 and not morphed images 1024. The morphed image detection logic 40 may process the images using a morphed image detection algorithm 1010M and determine whether they are morphed images or not. The surveillance logic 60 may process the images using a morphed image detection algorithm 1010S and determine whether they are morphed images or not. The training system 1000 may comprise a result analyzer 1045 configured to determine a result N 1040 comprising a first ($N_p$) false positive rate and first ($N_f$) false negative rate. The training system 1000 can then adjust 1050 the similarity threshold and/or dissimilarity threshold to generate a second result N+1 100 comprising a second ($N_p$+1) false positive rate and second ($N_f$+1) false negative rate. The training system may comprise a performance calculator 1075 to compare 1070 results N 1040 and N+1 1060. The training system 1000 could repeat 1080 this process many times (10, 100, 1000, 500,000, etc.) to determine which values for the similarity threshold and dissimilarity threshold generate the lowest false positive rate and false negative rate. The training system 1000 may comprise settable hyperparameters 1085 for the training system 1000 could be configured such that the training system will seek a lowest average value for both the false positive rate and false negative rate. In other configurations, the training system might implement a score weighting in order to favor a lower false positive rate over a false negative rate, or vice versa.

The morphed image detection logic and/or the surveillance logic may be configured to execute multiple (M) morphed image detection algorithms (wherein M is a natural number). The training system could switch the morphed image detection algorithm and determine optimal values for the similarity threshold and dissimilarity threshold for the second (M+1) algorithm (e.g., repeat for alternate morphed image detection algorithm 1090.) The training system could determine false positive rates or false negative rates for all M algorithms and select an algorithm that provides a lowest false positive rate and false negative rate 1095. Specific hyperparameters of the morphed data detection algorithm may be adjusted depending on comparison speed desired, hardware to perform the comparison, what types of images are being processed, etc.

In an exemplary configuration a security system may comprise an enrollment logic configured to store in a user record in a user database: reference biographic data about a user; reference biometric data about the user; and a reference image of the user. The security system may comprise a first security kiosk configured to: capture a first biographic information about the user from an ID card and capture a first kiosk image of biometric information about the user from the ID card. The security system may comprise a second security kiosk configured to: capture a second biographic information about the user from the ID card and capture a second kiosk image of biometric information about the user from the ID card. The security system may comprise a third security kiosk configured to: capture a third biographic information about the user from the ID card and capture a third kiosk image of biometric information about the user from the ID card. The security system may comprise an $N^{th}$ security kiosk configured to: capture an $N^{th}$ biographic information about the user from the ID card; and capture an $N^{th}$ kiosk image of biometric information about the user from the ID card. N may be a natural number larger than 3. The security system may comprise a user database connected to the first security kiosk; the user database may be configured to store the first kiosk image, second kiosk image, third kiosk image, and $N^{th}$ kiosk image in an image gallery. The security system may comprise a surveillance camera configured to capture a set of surveillance images of the user. The set of images may comprise a first surveillance image, second surveillance image, third surveillance image, and $N^{th}$ surveillance image; wherein N is a natural number greater than 3. The security system may comprise a surveillance database comprising the set of surveillance images captured by a plurality of surveillance cameras.

The security system may comprise a surveillance logic comprising a processor, computer readable media, memory, a network interface, and computer code non-transitorily stored in the memory and executable by the processor to cause the processor to: execute a morphed image detection algorithm comprising parameter; determine a first relative similarity value of the first surveillance image as compared to the reference image; determine a second relative similarity value of the second surveillance image as compared to the reference image; determine a third relative similarity value of the second surveillance image as compared to the reference image; determine a $N^{th}$ relative similarity value of the $N^{th}$ surveillance image as compared to the reference image; flag the first surveillance image as a morphed image if any of the relative similarity values are below a similarity threshold; and flag the first surveillance image as not comprising a morphed image if none of the relative similarity values are below the similarity threshold.

The security system may comprise a surveillance logic comprising a processor, computer readable media, memory, a network interface, and computer code non-transitorily stored in the memory and executable by the processor to cause the processor to: execute a morphed image detection algorithm comprising parameter; determine a first relative dissimilarity value of the first surveillance image as compared to the reference image; determine a second relative dissimilarity value of the second surveillance image as compared to the reference image; determine a third relative dissimilarity value of the second surveillance image as compared to the reference image; determine a $N^{th}$ relative dissimilarity value of the $N^{th}$ surveillance image as compared to the reference image; flag the first surveillance image as a morphed image if any of the relative dissimilarity values are below a similarity threshold; and flag the first surveillance image as not comprising a morphed image if none of the relative similarity values are above the dissimilarity threshold.

The security system may comprise communication logic configured to send a signal to an access control device comprising: instructions to shift the access control device into an access granted position if the surveillance logic has flagged the ID card as not comprising a morphed image; instructions to shift the access control device into an access denied position if the surveillance logic has flagged the ID card as comprising a morphed image; and the access control device may be configured to receive the signal from the communication logic and shift into the access granted position or access denied position depending on the instructions.

The security system may comprise a user identification logic configured to: compare a plurality of kiosk images captured within a preset time period against the first flagged surveillance image; generate a similarity score for the kiosk images and the first flagged surveillance image; select one or more kiosk images having a similarity score above an identification threshold value; identify one or more ID cards associated with the one or more selected kiosk images; obtain the biographic information about the user associated with the one or more identified ID cards from the user database; identify the user associated with the biographic information; and send a message to a system operator; the message containing a designation that the user has been flagged for using a morphed image, a copy of the user's facial image from the ID card, and at least some of the biographic information of the user.

The security system may be configured to: identify an image on an ID card as a morphed image; identify the user that presented the ID card as a valid form of identification; identify additional users bearing a resemblance to the morphed image on the ID card; and instruct the access control device to shift into the access denied position when the user arrives at or near the access control device; wherein near is within Y feet or meters. In certain configurations, surveillance logic may be configured to track a location of a person. The surveillance logic may send an access denied signal to any access control devices that are within a trajectory of the user (e.g. the user is trying to escape or exit) is near or within a certain distance away from the user (10 feet or 3 meters, etc.)

The security system may comprise surveillance logic configured to: determine a first relative dissimilarity value of the first surveillance image as compared to the reference image; determine a second relative dissimilarity value of the first surveillance image as compared to the reference image; determine a third relative dissimilarity value of the first surveillance image as compared to the reference image; determine a $N^{th}$ relative dissimilarity value of the first surveillance image as compared to the reference image; flag the first surveillance image as a morphed image if any of the relative dissimilarity values are above a dissimilarity threshold; and flag the first surveillance image as not comprising a morphed image if none of the relative similarity values are above the dissimilarity threshold.

The security system may comprise a training system comprising a second processor, second computer readable media, second memory, a second network interface, and second computer code non-transitorily stored in the second memory and executable by the second processor to cause the second processor to determine values for the parameters through machine learning.

The security system may be configured to: set an initial value for a similarity threshold; set an initial value for a dissimilarity threshold; determine a calibrated similarity value for the similarity threshold that generates a lowest false positive rate and false negative rate when the surveillance system uses the similarity threshold for processing of surveillance images; and determine a calibrated dissimilarity value for the dissimilarity threshold that generates a lowest false positive rate and false negative rate when the surveillance system uses the dissimilarity threshold for processing of surveillance images. The training system may comprise a dataset images comprising morphed images and not morphed images.

The training system may be configured to: process the dataset images with the morphed image detection algorithm; determine whether the dataset images are morphed or not morphed; determine a first false positive rate for dataset images that have been identified as morphed images when the dataset images are not morphed. The training system may be configured to execute an error rate calibration process comprising: (i) adjusting the initial similarity value to a second similarity value; (ii) executing the morphed image detection algorithm on the dataset images that were previously processed by surveillance logic; (iii) determining a second false positive rate for dataset images that have been identified as morphed images when the dataset images are not morphed using the second similarity threshold; and (iv) comparing the first false positive rate to the second false positive rate and selecting a false positive rate that has a lower value. The training system may be configured to repeat the error rate calibration process X times, wherein X is a natural number larger than 2. This means the training system may determine error rates for other similarity values. The error rate calibration process may comprise adjusting an $X-1^{th}$ similarity value to an $X^{th}$ similarity value. In other words, select the next similarity value or incrementing the similarity value. The error rate calibration process may comprise: executing the morphed image detection algorithm on the dataset images that were previously processed by surveillance logic using the $X^{th}$ similarity value; determining an $X^{th}$ false positive rate for dataset images that have been identified as morphed images when the dataset images are not morphed using the $X^{th}$ similarity threshold; comparing the $X^{th}$ false positive rate to previously calculated false positive rates; determining a lowest false positive rate of the previously calculated false positive rates; and setting the calibrated similarity value to a similarity value that the lowest false positive rate.

Through the above process, error rates can be determined for the next or the $X^{th}$ similarity value. The training system can be configured to perform a minimization function that searches or determines the lowest error rate for all the similarity value tested. The training system may then set the calibrated similarity value as the similarity value that yielded the lowest error rate. There are many types of error rates that can be calibrated. A false positive rate or a false negative rate are examples of error rates. The training system may be configured to determine a first error rate for dataset images that have been misidentified. Misidentified may mean or include identifying dataset images as morphed images when the dataset images are not morphed images; or identifying dataset images as not morphed images when the dataset images are morphed images. In other words, misidentifying means the algorithm processed the data (an image this example) and generated an identification, decision, or output. However, this identification is factually incorrect. The training system (the result analyzer 1045) can determine output is incorrect because it has access to whether or not the dataset image is or is not a morphed image.

The training system may be configured to execute an error rate calibration process comprising: adjusting the initial similarity value to a second similarity value; executing the morphed image detection algorithm on the dataset images that were previously processed by surveillance logic; determining a second error rate for dataset images that have been misidentified; comparing the first error rate to the error rate and selecting an error rate that has a lower value. The training system may repeat the error rate calibration process X times, wherein X is a natural number larger than 2. Repeating the error rate calibration process may comprise: adjusting an $X-1^{th}$ similarity value to an $X^{th}$ similarity value; executing the morphed image detection algorithm on the dataset images that were previously processed by surveillance logic using the $X^{th}$ similarity value; determining an $X^{th}$ error rate for dataset images that have been identified as morphed images when the dataset images are not morphed using the Xi similarity threshold; comparing the $X^{th}$ error rate to previously calculated error rates; determining a lowest error rate of the previously calculated error rates; and setting the calibrated similarity value to a similarity value that the lowest error rate.

The training system may also be configured to process the dataset images with the morphed image detection algorithm; determine whether the dataset images are morphed or not morphed; determine a first false positive rate for dataset images that have been identified as morphed images when the dataset images are not morphed; determine a first false negative rate for dataset images that have been identified as not morphed images when the dataset images are morphed; and execute an error rate calibration process. The error rate calibration process may comprise: adjusting the initial similarity value to a second similarity value; adjusting the initial dissimilarity value to a second dissimilarity value; executing the morphed image detection algorithm on the dataset images that were previously processed by surveillance logic; determining a second false positive rate for dataset images that have been identified as morphed images when the dataset images are not morphed using the second similarity threshold; determining a second false negative rate for dataset images that have been identified as not morphed images when the dataset images are morphed using the second dissimilarity threshold; comparing the first false positive rate to the second false positive rate and selecting a false positive rate that has a lower value; comparing the first false negative rate to the second false negative rate and selecting a false negative rate that have a lower value; repeating the error rate calibration process X times, wherein X is a natural number larger than 2; wherein repeating the error rate calibration process comprises: adjusting an $X-1^{th}$ similarity value to an $X^{th}$ similarity value; adjusting an $X-1^{th}$ dissimilarity value to an $X^{th}$ dissimilarity value; executing the morphed image detection algorithm on the dataset images that were previously processed by surveillance logic using the $X^{th}$ similarity value and $X^{th}$ dissimilarity value; determining an Xi false positive rate for dataset images that have been identified as morphed images when the dataset images are not morphed using the $X^{th}$ similarity threshold; determining an $X^{th}$ false negative rate for dataset images that have been identified as not morphed images when the dataset images are morphed using the $X^{th}$ dissimilarity threshold; comparing the $X^{th}$ false positive rate to previously calculated false positive rates; determining a lowest false positive rate of the previously calculated false positive rates; comparing the $X^{th}$ false negative rate to previously calculated false negative rates; determining a lowest false negative rate of the previously calculated false positive rates; and setting the calibrated similarity value to a similarity value that generated a lowest mean value for the false negative rate and false positive rate. A lowest mean value is a lowest average value of the false negative rate and false positive rate. For example:

| Similarity Value | False Positive Rate | False Negative Rate |
| --- | --- | --- |
| First Value | 0.2 | 0.2 |
| Second Value | 0.3 | 0.05 |
| Third Value | 0.1 | 0.2 |
| Fourth Value | 0.1 | 0.01 |
| Xth Value | 0.01 | 0.5 |

In this example, X equals 5. The lowest average error rate would be generated by the fourth value. The training system would set the similarity threshold (a parameter of the morphed image detection algorithm) as the fourth value.

Figure 11:
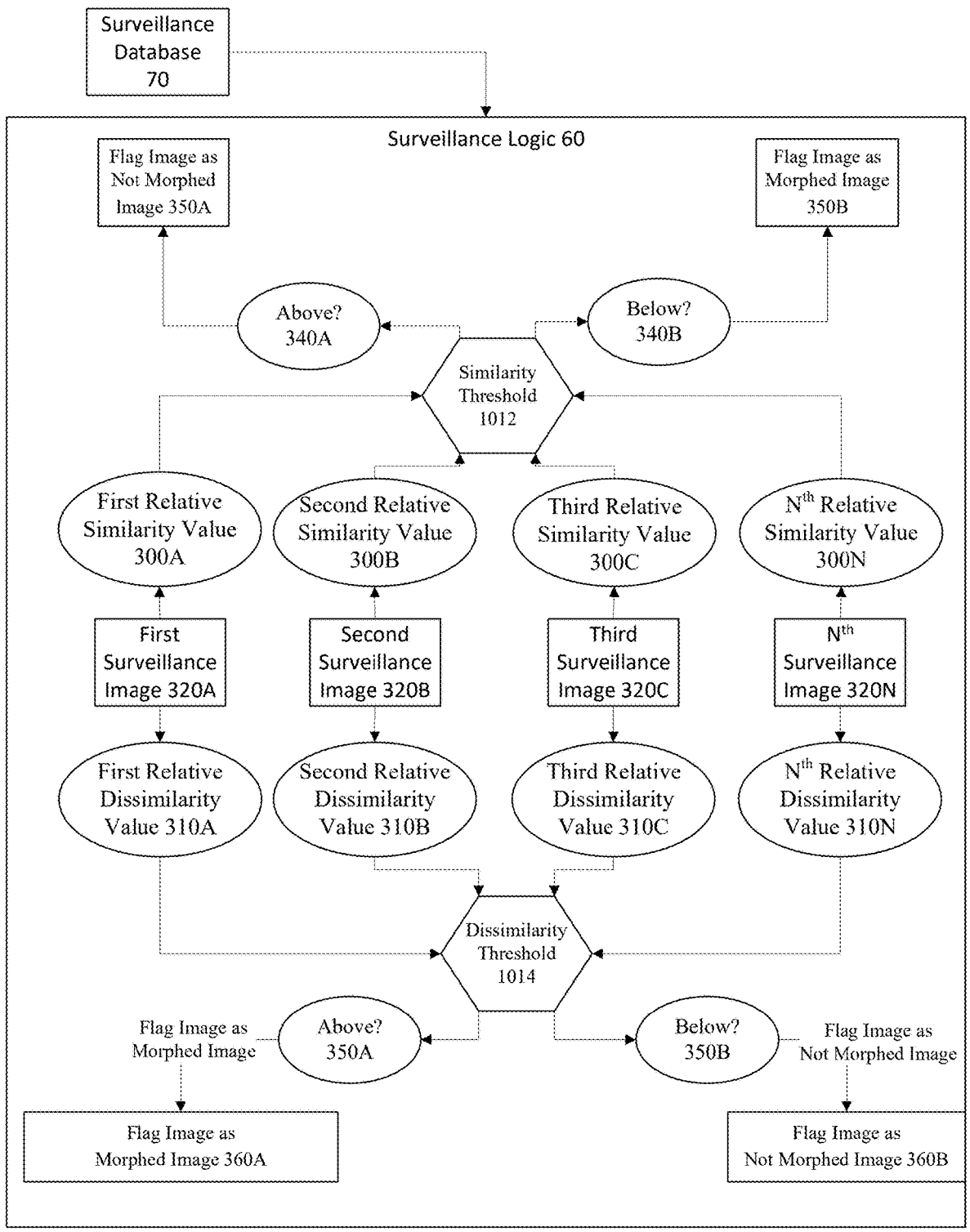
FIG. 11 is a detailed view of the surveillance similarity logic.

FIG. 11 show the surveillance database 70 connected to the surveillance logic 60. The surveillance logic 60 may comprise cameras (180A-180D) or it may be connected to these cameras. In some configurations, the cameras themselves may comprise the surveillance logic (e.g., "smart" cameras.)

The security kiosks may be configured to capture "kiosk" images of the user. The surveillance cameras/surveillance logic may be configured to capture "surveillance" images of the user. The user database may store the kiosk images and/or surveillance images. The surveillance database may store the kiosk images and surveillance images. The surveillance logic 60 may be configured to determine a first relative similarity value 300A and/or a first relative dissimilarity value 310A for a first surveillance image 320A. The first relative similarity value may be a measurement of how similar a surveillance image is compared other images of other surveillance images of the same user in the surveillance database or the user database. The first relative dissimilarity value may be a measurement of how dissimilar a surveillance image is compared other images of other surveillance images of the same user in the surveillance database or the user database. For example, the surveillance logic may be configured to determine a first relative similarity value of a first surveillance image as compared to the reference image; second relative similarity value 300B of a second surveillance image as compared to the reference image; a third relative similarity value 300C of a third surveillance image as compared to the reference image; and an $N^{th}$ relative similarity value 300N of a $N^{th}$ surveillance image as compared to the reference image.

The surveillance logic may be configured to flag a surveillance image as a morphed image if any of the relative similarity values are below a first threshold 1012. Or, the surveillance logic may be configured to flag a surveillance image as a morphed image if a majority of the relative similarity values are below a first threshold 1012. The first threshold of the surveillance logic "similarity threshold value" may be the same as the first threshold of the morphed image detection logic or it may be a different value. The second threshold of the surveillance logic "dissimilarity threshold value" may be the same as the second threshold of the morphed image detection logic or it may be a different value.

The training system 1000 may be configured to train a morphed image detection algorithm 1010. In some configurations, the morphed image detection logic 40 and the surveillance logic 60 may comprise a morphed image detection algorithm 1010. The algorithms may be the same or they may be different depending on the configuration. Likewise, the parameter including the similarity threshold 1012 and the dissimilarity threshold 1014 may be the same for the morphed image detection logic 40 and the surveillance logic 60 may be the same or they may be different. It is contemplated that the circuitry and optics of the camera taking the security kiosk images may be different than the circuitry and optics of the surveillance camera. In addition, the lighting and the background of the camera taking the security kiosk images may be different than the circuitry and optics of the surveillance camera. As a result, in some configurations, the morphed image detection logic may comprise a morphed image detection algorithm (optionally with different parameters) that is different than the morphed image detection algorithm of the of the surveillance logic. The flowchart of FIG. 9 is an example morphed image detection algorithm 1010M for the morphed image detection logic. The flowchart of FIG. 11 is an example morphed image detection algorithm 1010S for the surveillance logic. As shown in the examples, these algorithms share some common elements, but are different. They may or may not have the same values for the parameters.

The security system may be configured to use facial recognition and/or determine user identity from the biographic information in the user's ID card. The surveillance logic may be configured to store a plurality of surveillance images in an image gallery associated with the user (discussed above). The surveillance logic may be configured to analyze a plurality of surveillance images of that user (e.g., images from the image gallery associated with that user) to determine that facial image similarity is above 340A a similarity threshold value 330. The surveillance logic 60 may flag the image as not a morphed image 350A (e.g., a "normal image") if it determines that the facial image similarity is above 340A the similarity threshold. The surveillance logic may flag 350B the image as comprising or likely comprising a morphed image if the surveillance logic determines that the first relative similarity value for the first surveillance image is below 340B the similarity threshold value 1012.

The surveillance logic may flag the first, second, third, or $N^{th}$ surveillance image as comprising or likely comprising a morphed image and optionally identify the user if the surveillance logic determines that that one or more of the first, second, third, or Ni relative similarity value (300A, 300B, 300C, 300N respectively) for the user is below the similarity threshold value 1011. The surveillance logic may flag 350A the first, second, third, or $N^{th}$ surveillance image as comprising or likely comprising a morphed image and optionally identify the user if the surveillance logic determines that a majority of the first, second, third, or $N^{th}$ relative similarity value (300A, 300B, 300C, 300N respectively) for the user is below the dissimilarity threshold value 1014.

The surveillance logic may flag the first, second, third, or $N^{th}$ surveillance image as not comprising or not likely comprising a morphed image and optionally identify the user if the surveillance logic determines that that none of the first, second, third, or $N^{th}$ relative similarity values (300A, 300B, 300C, 300N respectively) for the user are below the similarity threshold value 1012. The surveillance logic may flag 350B the first, second, third, or Ni surveillance image as not comprising or not likely comprising a morphed image and optionally identify the user if the surveillance logic determines that a majority of the first, second, third, or Ni relative similarity value (300A, 300B, 300C, 300N respectively) for the user is above the similarity threshold value 1012.

FIG. 11 shows that the surveillance logic may comprise a first surveillance image 320A, second surveillance image 320B, third surveillance image 320C, and $N^{th}$ surveillance image 320N. The surveillance logic may generate a first relative similarity value 300A, second relative similarity value 300B, a third relative similarity value 300C, an $N^{th}$ relative similarity value 300N, a first relative dissimilarity value 310A, a second relative dissimilarity value 310B, a third relative dissimilarity value 310C, and an $N^{th}$ relative dissimilarity value 310N. The different surveillance images may correspond to additional photos of the same user captured by the surveillance similarity logic and/or surveillance camera(s). The surveillance logic may generate relative similarity values and dissimilarity values for a plurality of users and determine for each user whether the surveillance logic should flag the captured surveillance image as (likely) a morphed image or not (likely) a morphed image.

The surveillance logic may flag the first, second, third, or $N^{th}$ surveillance image as comprising or likely comprising a morphed image and optionally identify the user if the surveillance logic determines that that one or more (any) of the first, second, third, or $N^{th}$ relative dissimilarity value (310A, 310B, 310C, 310N respectively) for the user is above the dissimilarity threshold value 1014. The surveillance logic may flag 360A the first, second, third, or Ni surveillance image as comprising or likely a morphed image and optionally identify the user if the surveillance logic determines that a majority of the first, second, third, or $N^{th}$ relative dissimilarity value (310A, 310B, 310C, 310N respectively) for the user is above the dissimilarity threshold value 1014.

The surveillance logic may flag the first, second, third, or $N^{th}$ surveillance image as not comprising or not likely comprising a morphed image and optionally identify the user if the surveillance logic determines that that none of the first, second, third, or $N^{th}$ relative dissimilarity values (310A, 310B, 310C, 310N respectively) for the user are above the dissimilarity threshold value 1014. The surveillance logic may flag 360A the first, second, third, or $N^{th}$ surveillance image as not comprising or not likely comprising a morphed image and optionally identify the user if the surveillance logic determines that a majority of the first, second, third, or Ni relative dissimilarity value (310A, 310B, 310C, 310N respectively) for the user is below the dissimilarity threshold value 1014.

Figure 12:
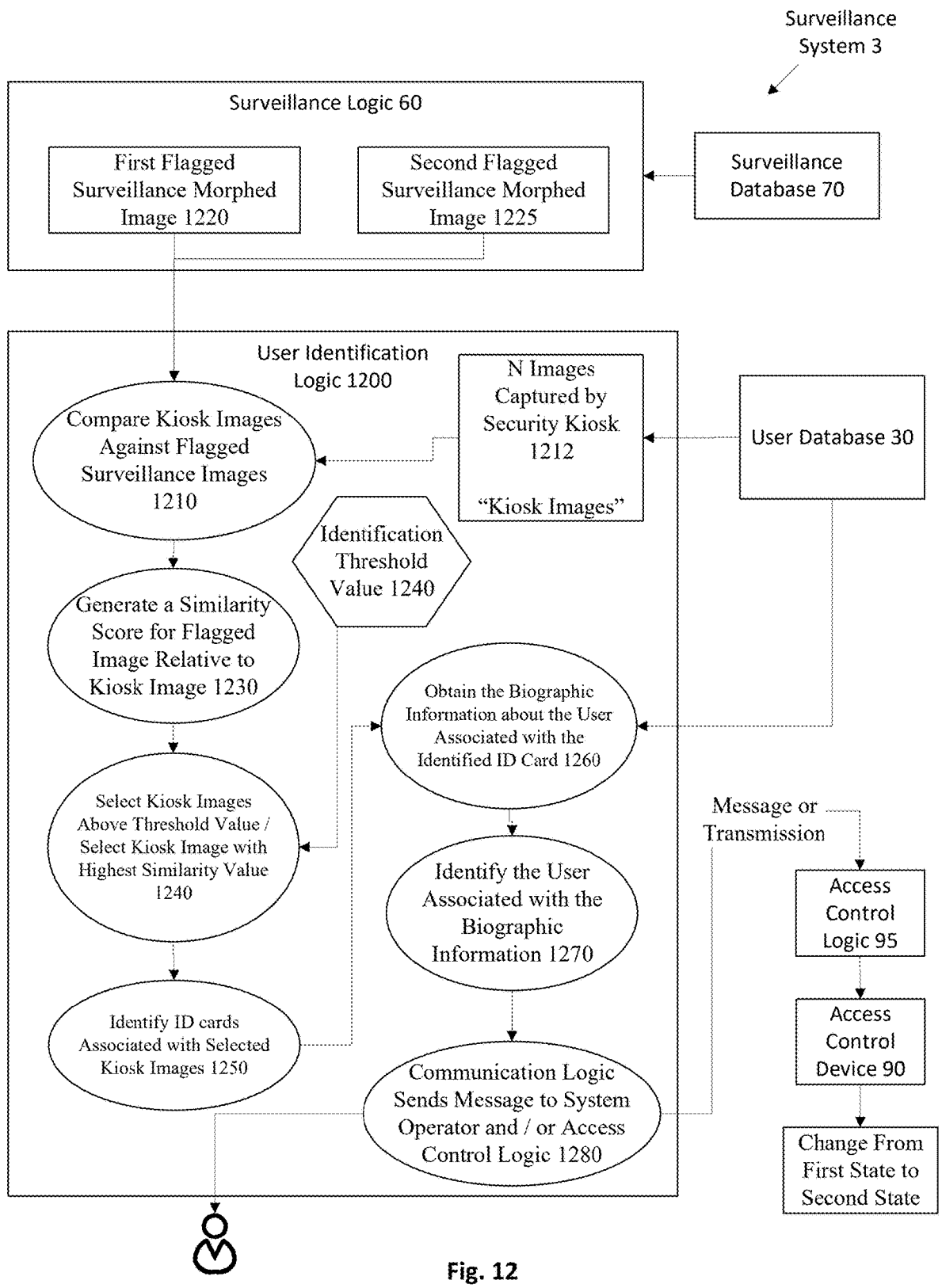
FIG. 12 is a detailed view of the user identification logic.

FIG. 12 illustrates a surveillance system 3. The security system 1 may comprise the surveillance system 1. The surveillance system illustrates an event in which a user has attempted to use an ID card with a morphed image, the security system 1 has flagged the ID Card as comprising or likely comprising a morphed image, and user is attempting to pass through a checkpoint (a gate, door, turn-style, hatch, port, etc.) to escape being apprehended by security. FIG. 12 shows the surveillance logic 60, a user identification logic 1200, the surveillance database 70, user database 30, access control logic 95, and access control device 90. When the surveillance logic 60 captures an image of the user and determines the current image doesn't comprise a similarity value above a similarity threshold (or doesn't comprise a dissimilarity value below a dissimilarity threshold) the surveillance logic may flag the image as being or likely being a morphed image of the user. The user identification logic may compare 1210 a kiosk image from the security kiosk with surveillance image captured 1212 by the surveillance system.

A user may or may not be at security kiosk when the surveillance system captures the image and/or determines the captured image is a morphed image. The surveillance logic may flag the image 1220. The surveillance logic 60 may also flag additionally captured images such as a second captured image 1225. For example, a user attempting to use a disguise may have his or her surveillance image captured by a camera. The surveillance logic 60 may determine the captured image is or likely is a morphed image. The surveillance logic may send the captured image to the user identification logic 1200. The user identification logic 1200 may be configured to determine the identity of the user in the captured image. In other words, the user identification logic may be configured to identify a user associated with a flagged surveillance image.

As shown in FIG. 12, the user identification logic may be configured to compare or match 1210 the flagged image against kiosk images captured by security kiosk (if the security kiosk comprises a ID card scanner, the kiosk images may be "card images.") The user identification logic may utilize a subset of kiosk images (such as kiosk images scanned within an hour, 4 hours, a day, a week, etc.) to reduce the number of comparisons. The user identification logic may generate a similarity score for a flagged surveillance image relative to the kiosk images 1230. The user identification logic 1200 may select kiosk images above an identification threshold value 1240. Alternatively, the user identification logic may select a kiosk image with the highest similarity value. The user identification logic may be configured to identify one or more ID cards associated with the selected images 1250. In some configurations, the user identification logic obtains biographic information about the user when the security kiosk scans the ID card. In such configurations, the user identification logic can be programmed to locate the stored biographic information for a specific kiosk image 1260. The biographic information may come from the user database or the user identification logic may be configured to obtain the biographic information from the selected kiosk images themselves (QR lookup, OCR, etc.) The user identification logic may have identified a user when the user identification logic has matched a set of biographic information to the flagged image 1270. For example, the user's name, address, and phone has been matched to a captured picture of the user. The user identification logic may send a message using communication logic 80 to a system operator that the user has been identified 1280. The message may include some of the biographic information and/or facial image of the user, an indicator that the ID card has been flagged as possibly containing or containing a morphed image.

The surveillance system 3 may be configured to provide real time updates on the user's current location by sending updates through the communication logic 80 of the last known position of the user. The surveillance system may determine a last known position of the user, but identifying which surveillance camera captured the image of the user and at what time. The cameras may store a time and date stamp in the metadata of the captured images.

The surveillance system 3 may be configured to lockout or lock-in the user. The surveillance system may instruct the access control device to shift into access denied position for the user at any controlled access point or access control device. The surveillance system may also instruct the access control devices to shift into a lockdown mode.

Figure 13:
FIG. 13 shows an electronic gate system.

FIG. 13 shows an a picture of an access control device 90 comprising 4 electronic gates.

Figure 14:
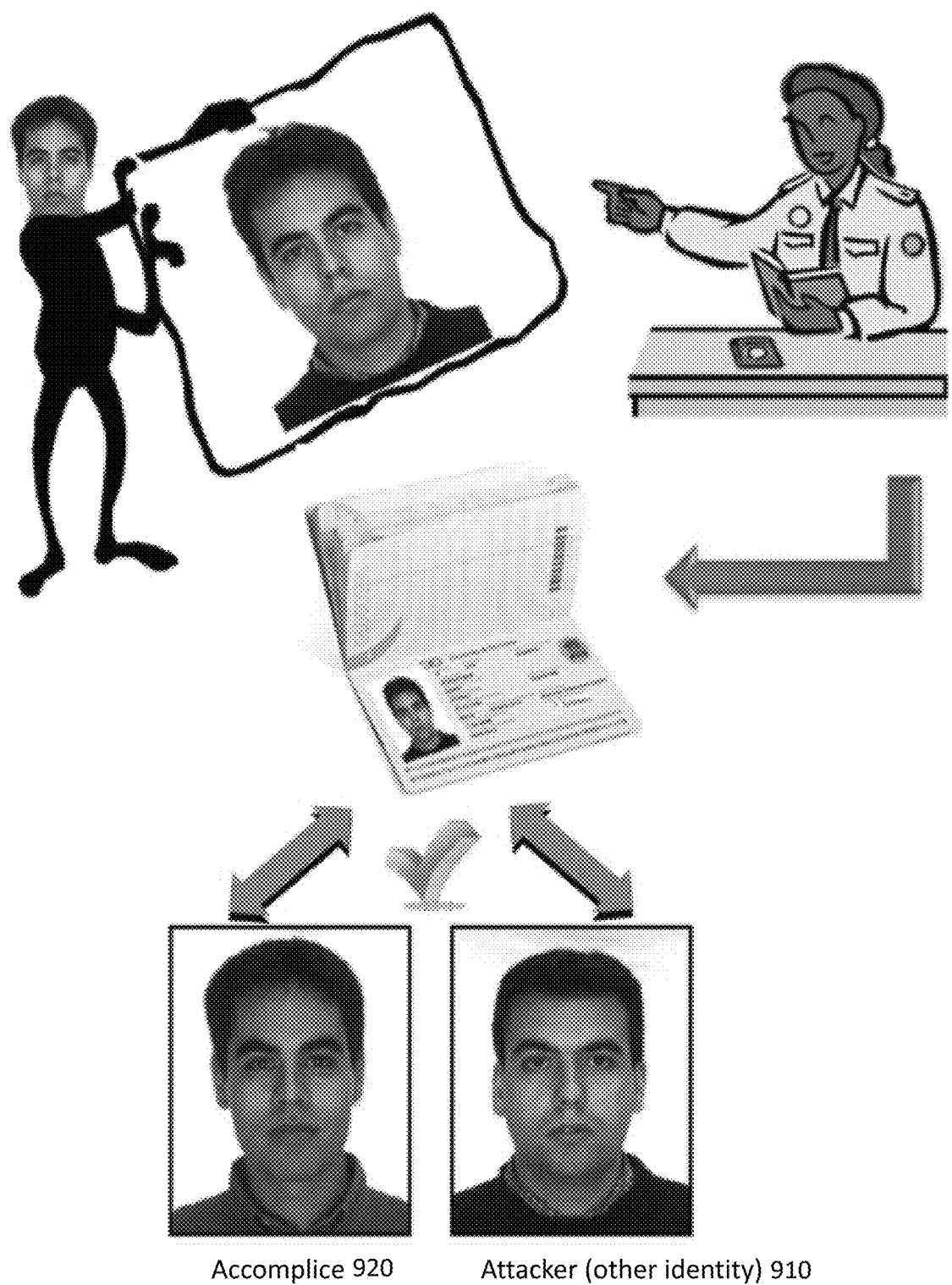
FIG. 14 shows a use case of face morphing.

FIG. 14 shows a process in which an attacker 910 uses an accomplice 920 to update his passport. An attacker 910 might use the updated passport with a photo of the accomplice to gain access to a secure location, system, or container that attacker should not be able to access. Using morphing technology to adjust the image on the accomplice passport, allows the attacker to use the accomplice's passport because he or she looks enough like the accomplice. When performed, the attacker 910 can decouple a biometric facial image to the biographic data. If, for example, the accomplice is not supposed to be able to access a secure area, he can use the ID which contains the attacker's biographic information. For example, a card scanner might verify that a user's ID card has biographic information that matches a record in the user database. A security guard or a machine might verify that an image of the user's face matches an a stored reference image in the database. However, in this example, the attacker merely resembles the accomplice and basically fools the biometric authentication (false negative). There are many different scenarios that attackers and accomplices can conjure to exploit weaknesses in human's ability to match faces to pictures. The security system 1 as described may utilize a morphed image detection logic to determine the attacker has used a morphed image to gain wrongful access to a secure location, system, or container.

Figure 15:
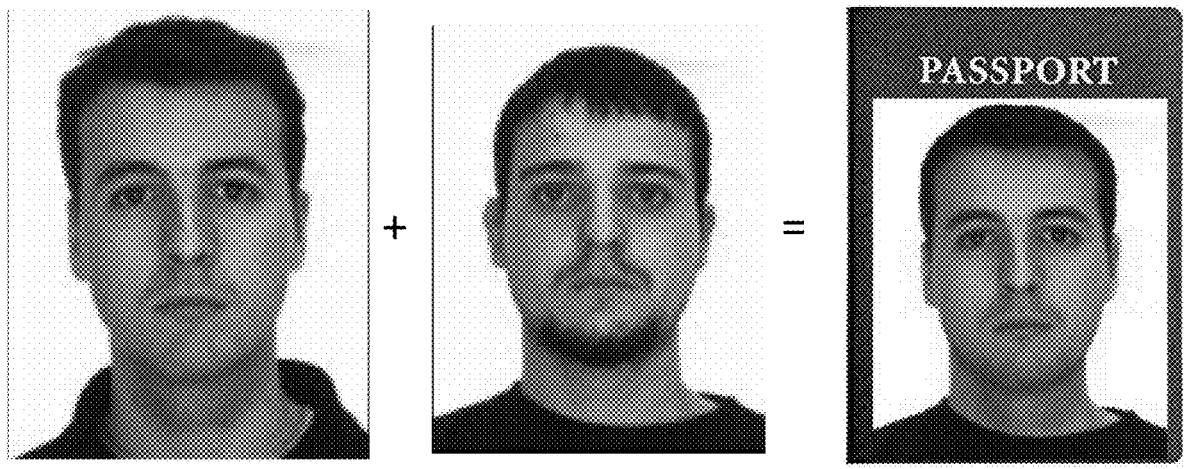
FIG. 15 shows a morphed image in a passport.

FIG. 15 illustrates a scenario where the attacker uses image morphing to create an ID that two people can use. The security system 1 is designed to flag and potentially detain an individual using a morphed photo like this.

FIG. 16 illustrates a scenario where a member of a German activist group applied with a morphed image so that she resembled Federica Mogherini, a representative of the union of Foreign Affairs and Security Policy. The security system 1 may be configured to flag the use of a morphed photo like this. In application, the security system 1 would determine the photo presented on the ID Card does not match previous photos of the user within the similarity threshold (and/or the dissimilarity value is too high) and flag the image as a morphed image. The user in this hypothetical would be Federica Mogherini.

FIG. 17 illustrates a situation wherein an attacked uses a morphed image (b) based on images (a) and (c). The attacker's picture is really (c), but he is attempting to use the morphed image (b). Perhaps attacker (c) isn't allowed in a secured location. In this example, the absence of a mole creates an image dissimilarity value between images (c) and (b) that is higher than the second threshold. The morphed image detection logic 40 and/or surveillance logic 60 may flag the image as a morphed image. The communication logic may send a message to the access control logic to instruct the access control device to deny access users in possession of ID card with image (a), image (b), and/or image (c). The surveillance logic may also start tracking the location of the user within the location using the surveillance cameras. The surveillance logic may instruction the communication logic to send position updates to a security team.

FIG. 18 shows a first headshot 1301 and a second headshot 1302. The third headshot 1303 is a morphed image of the first headshot and the second headshot using a Face_Morpher algorithm.

FIG. 19 shows a first headshot 1301 and a second headshot 1302. The fourth headshot 1304 is a morphed image of the first headshot and the second headshot using a OpenCV algorithm.

FIG. 20 shows a first headshot 1301 and a second headshot 1302. The fifth headshot 1305 is a morphed image of the first headshot and the second headshot using a StyleGAN2 algorithm.

FIG. 21 shows a first headshot 1301 and a second headshot 1302. The sixth headshot 1306 is a morphed image of the first headshot and the second headshot using a FaceBlend algorithm.

These algorithms and additional ones are discussed in more detail in the Appendix.

Figure 22:
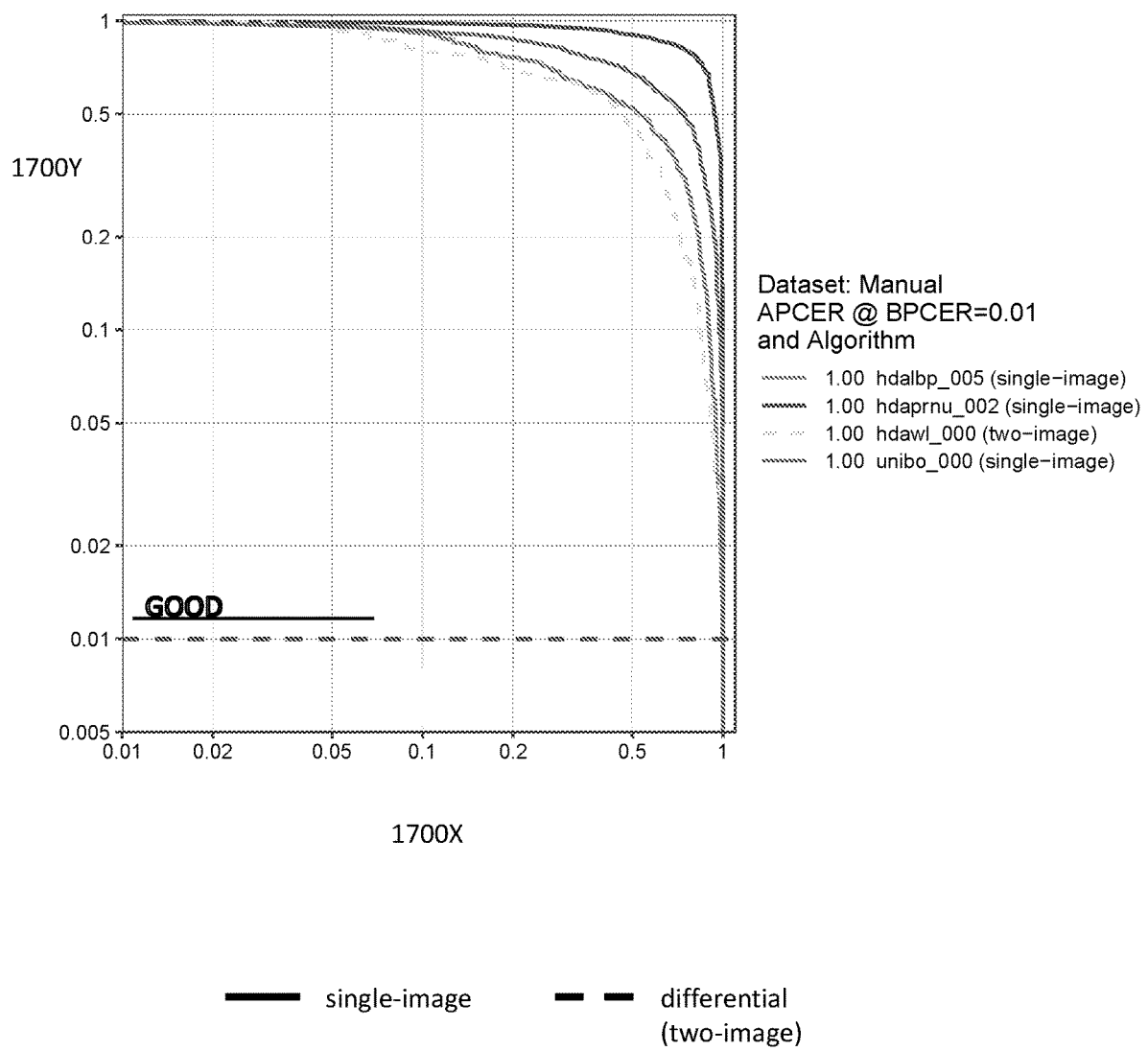
FIG. 22 shows a first chart of Morph Detection Performance.
Figure 23:
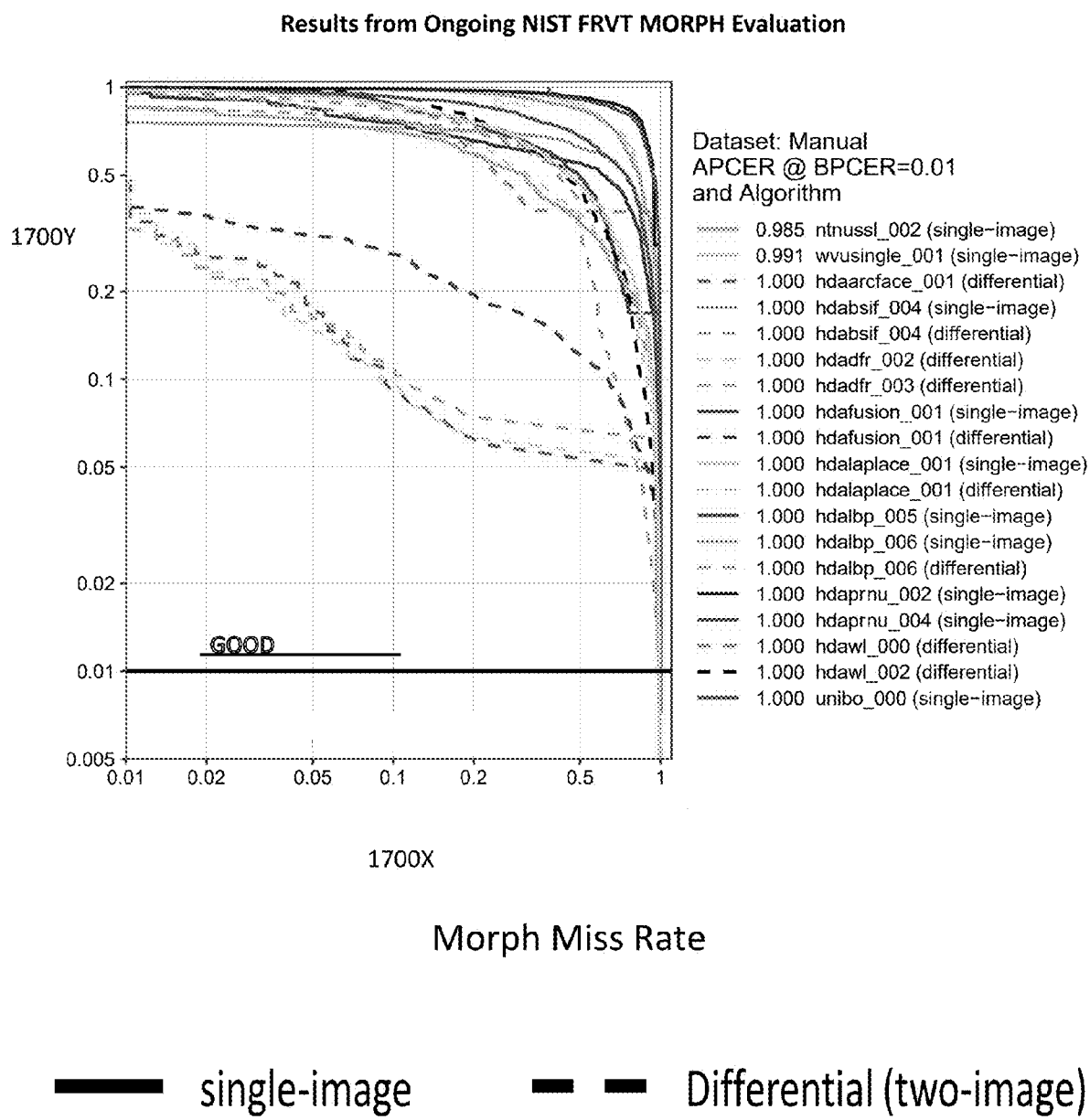
FIG. 23 shows a second chart of Morph Detection Performance.
Figure 24:
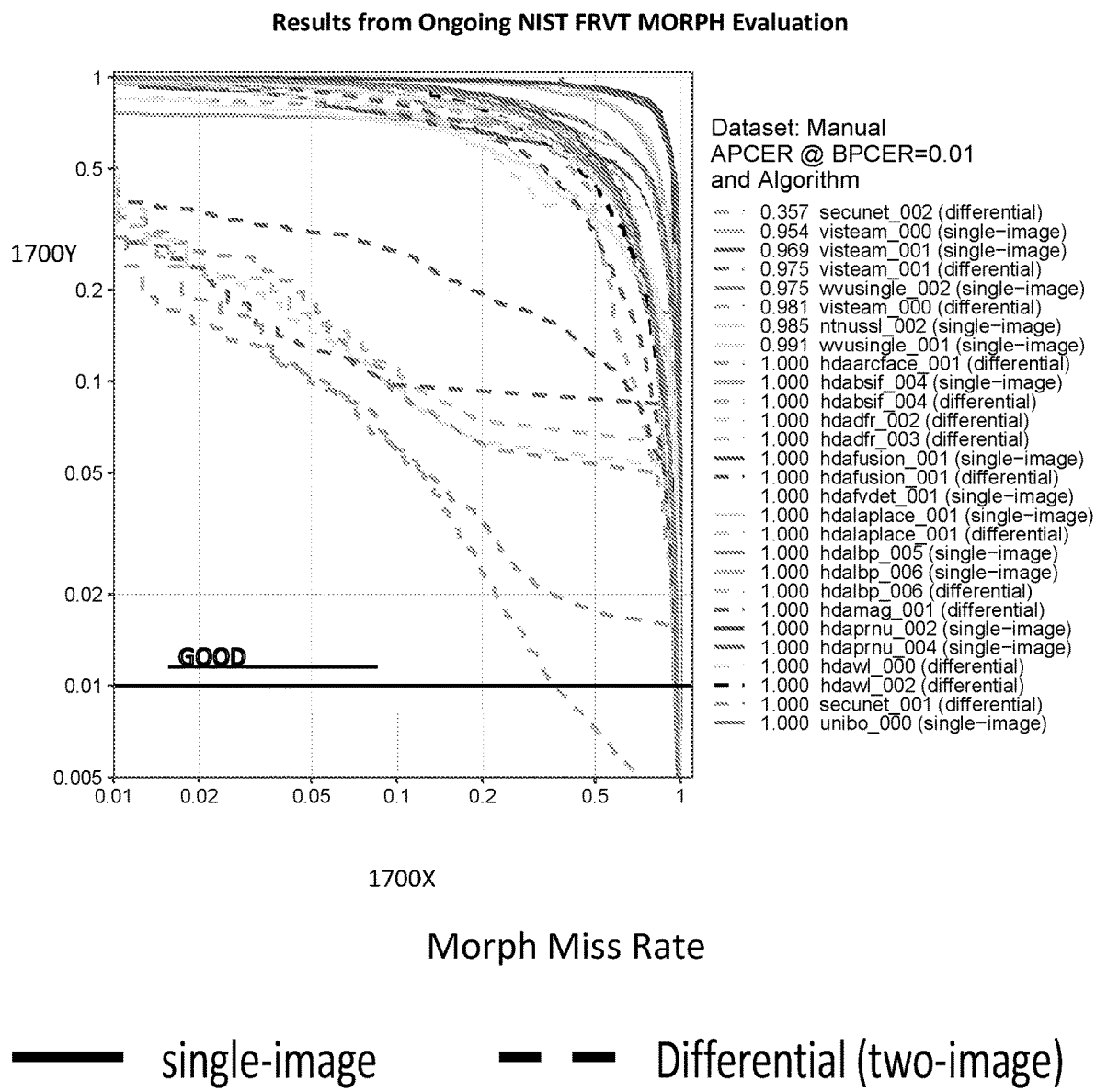
FIG. 24 shows a third chart of Morph Detection Performance.

FIGS. 22-24 illustrate morph detection performance. 1700Y is the Y-axis of the chart and shows the false detection rate, e.g., a bonafide classification error rate (BPCER). 1700X shows a morph miss rate, e.g., an attack presentation classification error rate (APCER).

Figure 25:
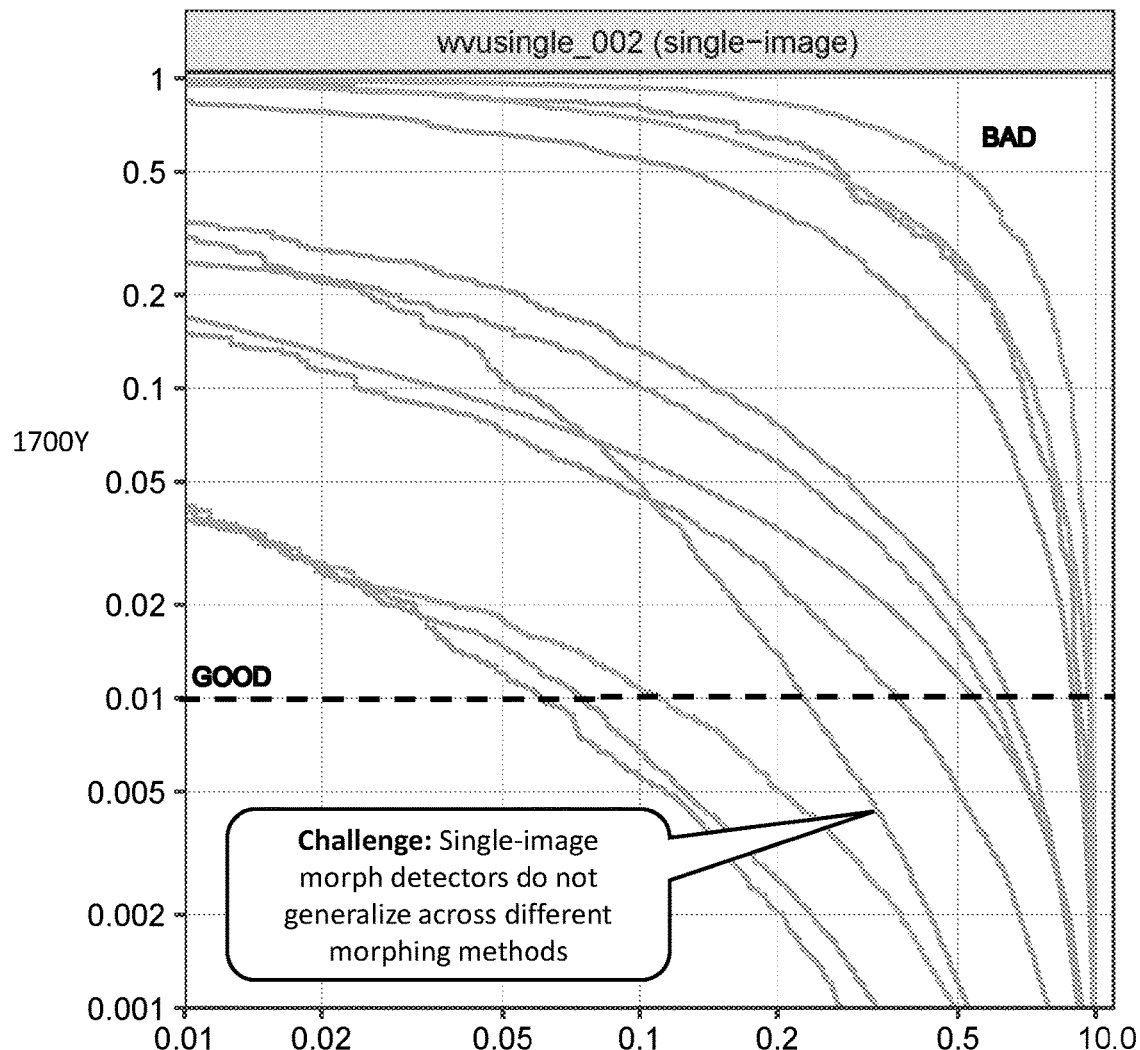
FIG. 25 shows a morph detection challenges and opportunities chart.

FIG. 25 shows challenges and opportunities for single-image morph detector that do not generalize across different morphing methods.

Figure 26:
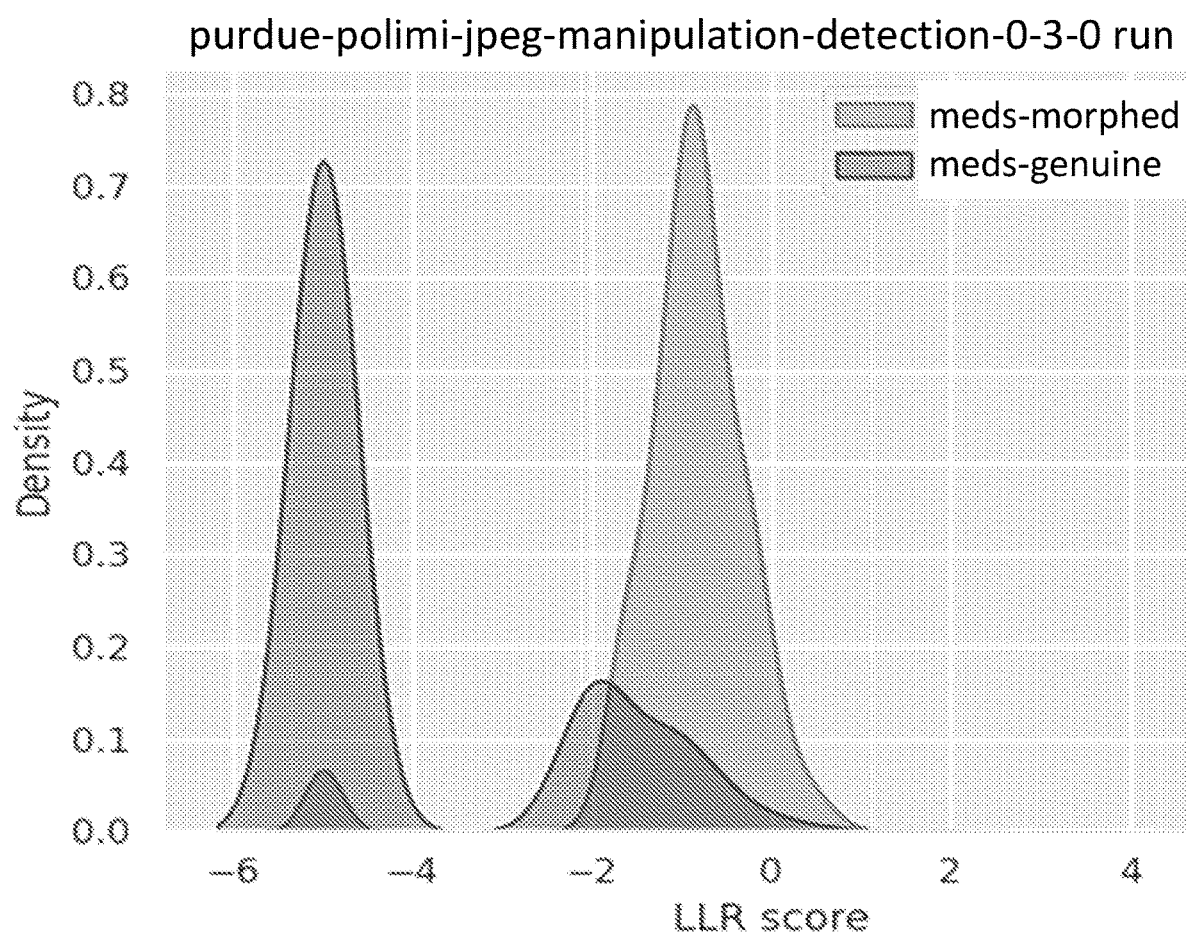
FIG. 26 shows a first graph of a sample SemaFor component evaluation

FIG. 26 shows a sample semafor component evaluation using purdue-polimi-jpeg-manipulation-detection-0-3-0 run against 1306 genuine and 1500 morphed images. The figure shows a graph of density vs LLR score (log-likelihood ratio).

Figure 27:
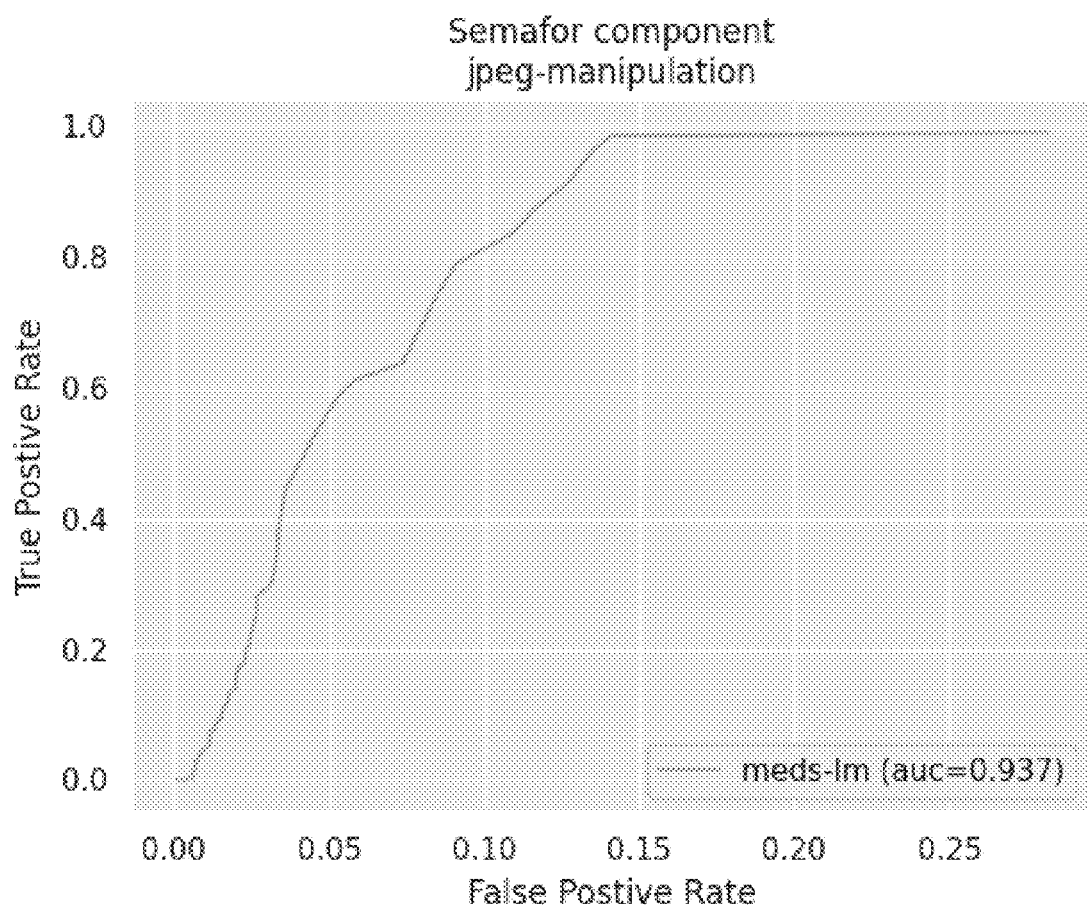
FIG. 27 shows a second graph of a sample SemaFor component evaluation.

FIG. 27 shows a sample semafor component evaluation using purdue-polimi-jpeg-manipulation-detection-0-3-0 run against 1306 genuine and 1500 morphed images. The figure shows a true positive rate vs false positive rate. AUC (area under curve).

Figure 28:
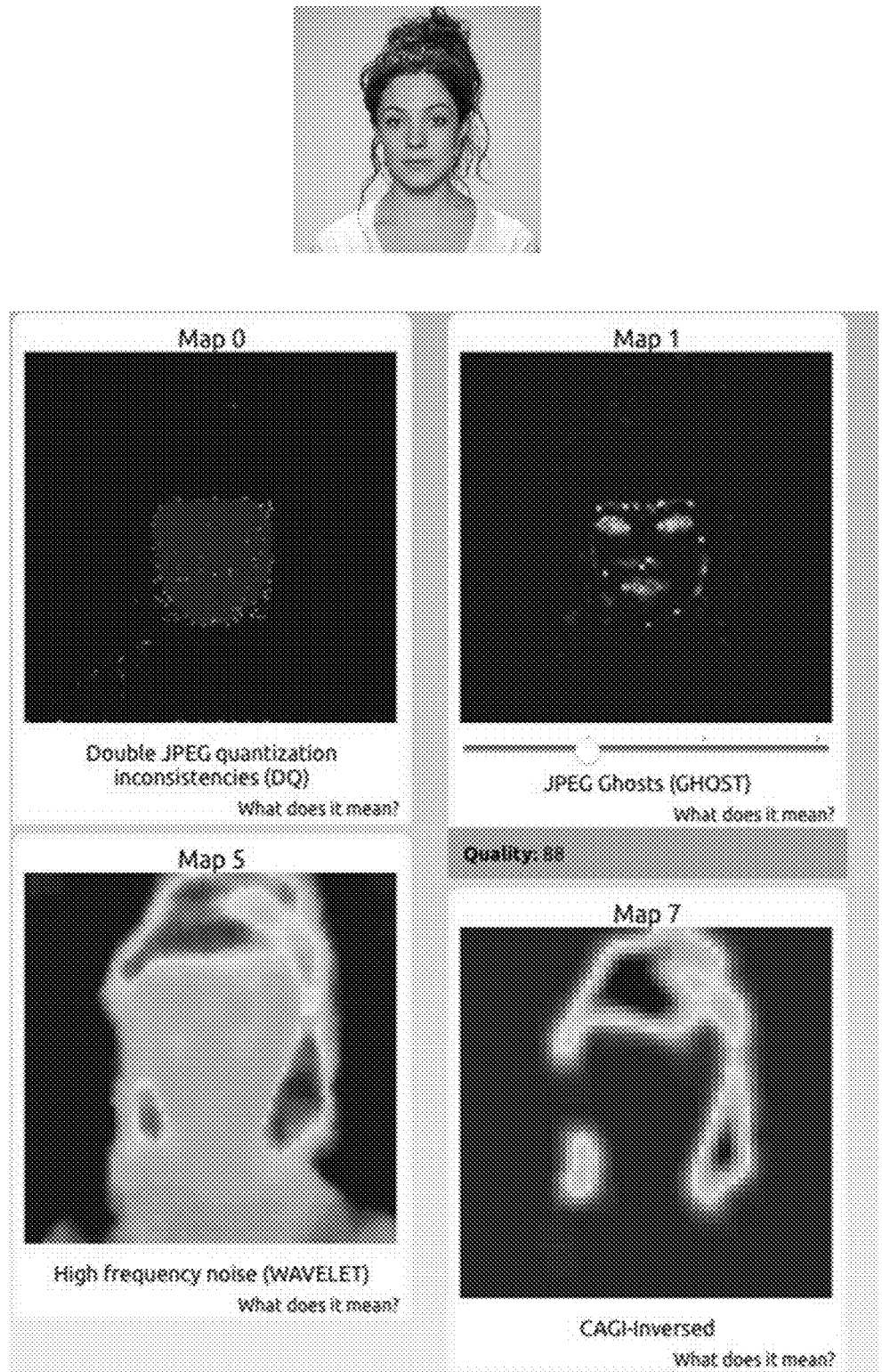
FIG. 28 shows images generated by a sample online forensic tool.

FIGS. 28-29 shows example forensic images generated by a forensics tool.

APPENDIX A

SemaFor Components

The Semantic Forensics (SemaFor) refers to the innovative semantic technologies for analyzing media such as morphed images. These technologies include semantic detection algorithms, which will determine if multi-modal media assets have been generated or manipulated. Attribution algorithms will infer if multi-modal media originates from a particular organization or individual. Characterization algorithms will reason about whether multi-modal media was generated or manipulated for malicious purposes. SemaFor technologies are configured to detect, attribute, and characterize adversary disinformation campaigns.

The security system, morphed image detection logic, and surveillance logic may comprise one or more of the following technologies for detecting image manipulations characteristic of landmark-based morphs. The security system, morphed image detection logic, and surveillance logic may comprise one or more of the following technologies for detecting GANs signatures present in GAN-based morphs (generative adversarial networks).

- purdue-polimi-jpeg-manipulation-detection-0-3-0, last updated Nov. 2, 2022. Summary: JPEG manipulation detection.
- purdue-unina-image-manipulation-local-two-0-0-22 (GPU DVC), last updated Sep. 30, 2022. Summary: The analytic component aims to localize manipulations by looking at local inconsistencies of the source.
- kitware-ub-image-generator-attribution-0-3-13 (GPU DVC), last updated Oct. 14, 2022. Summary: This analytic attributes images to generators.
- kitware-umichigan-cnn-detmatch-0-3-21 (GPU DVC), last updated Oct. 26, 2022. Summary: This analytic classifies Convolutional Neural Network (CNN) generated fake images.
- purdue-unisi-ganfacedetection-symmetry-0-2-10. Summary: The use of a Siamese Network XceptionNet with optimized chain of augmentation of faces.
- purdue-unisi-ganfacedetection-two-0-2-10. Summary: The use of XceptionNet with optimized chain of augmentation of faces including print and scan. Description: This analytic component is used for discriminating between GAN faces and Pristine
- kitware-generated-image-detection-residual-0-3-36. Summary: This analytic classifies computer-generated images. Description: This analytic classifies computer-generated images, such as GAN images, from photos captured by cameras. The input to the network is a residual image.
- kitware-ub-eye-consistency-detector-0-2-3. Summary: Synthetic media detection based on semantic level cues that are more robust and interpretable.

Image Datasets

Image datasets may provide the security system with examples of morphed photos and unmorphed photos for training and tuning various algorithms. For example, the security system could use one or more of the below datasets determine optimum values for the first threshold value and second threshold value. The security system may also be configured to use one or more of the below datasets to train or tune the algorithms associated with generating a similarity score or dissimilarity score.

The Chicago Face Database. 2015 doi.org/10.3758/si3428-014-0532-5

Face Research Lab London (AMSL). 2018 License (CC BY-SA 3.0), omen.cs.uni-magdeburg.de/disclaimer/index figshare.com/articles/dataset/Face_Research_Lab_London_Set/5047666

IDAP FRLL-morphs (with London Faces) idiap.ch/dataset/frll-morphs

MEDS-morph (tier II). Derived from NIST Special Dataset 32, 179 subjects with two or more frontal images Pairing by demographic similarity (age, gender, ethnicity)—6450 subject pairings NSF (CITeR) working on additional datasets, including print and scan FaceFusion (commercial, low cost for iOS)
  Launched in 2012, last updated in 2015
  Clean face mixing (artifact free), no batch automation
  Apple store discontinued for US, apps.apple.com/de/app/facefusion/id522183232

FantaMorph (commercial, low cost)
  Abrasoft, Windows and Mac
  fantamorph.com

UNIBO Automated Morph Face Generation Tool (v2.0) (no cost research tool, Bologna)
  Windows, automated
  Landmarks+blend
  biolab.csr.unibo.it Face_morpher (opensource (MIT), stasm/dlib, scipy)
  Available github.com/alyssaq/face_morpher Face-blend.py (Dlib plus OpenCV's affine warp, seamlessClone, and GaussianBlur)
  Linux or windows, automated batch, used for MEDS-morph WebMorph
  Web based version of PsychoMorph
  webmorph.org
  Code: github.com/debruine/webmorph Gnu image manipulation program (GIMP)
  Available gimp.org Dlib c library
  D. King. dlib.net Adobe Photoshop
  adobe.com/products/photoshop.html Opensource examples (select examples)
  github.com/alyssaq/face_morpher
  github.com/HighCWu/face_morpher_plus
  github.com/GeekLiB/face_morpher-master   (uses STASM)

Mobile Apps (face manipulation/entertainment)
  Reface, reface.app
  Reflect
  Avatarify

CONCLUSION

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing system" encompasses all apparatus, devices, and machines for processing data, including by way of example a programmable processor, a computer, or multiple processors or computers. The system may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Embodiments and functional operations described in this specification may be implemented in digital electronic circuitry, or in computer software, firmware, or hardware, including the structures disclosed in this specification and their structural equivalents, or in combinations of one or more of them. For example, elements designated as engines, generators, identifiers, tools, analyzers, calculators, classifiers, checkers, finders, logic recorders, visualizers, aggregators, modules, nodes, managers, organizers, algorithms, etc. may be implemented in a variety of ways. A computer program (also known as a program, software, software application, script, or code) may be written in any form of programming language, including compiled or interpreted languages, and it may be deployed in any form, including as a standalone program or as a module, component, subroutine, or other unit suitable for use in a computing environment.

A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide interaction with a user, embodiments may be implemented on a computer having a display device, like a TV or monitor (CRT or LCD, etc.) for displaying information to the user. Computers may have peripherals like a keyboard, trackpad, mouse, etc. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computer and/or computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

Computer System

The invention may include or be connected to a computer comprising a hardware processor communicatively coupled to an instruction memory and to a data memory. The instruction memory can be configured to store, on at least a non-transitory computer-readable storage medium as described in greater detail below, executable program code. The hardware processor may include multiple hardware processors and/or multiple processor cores. The hardware processor may include hardware processors from different devices that cooperate. The computer system may execute one or more basic instructions included in the memory executable program code in instruction memory.

Relationship Between Hardware Processor and Executable Program Code

The relationship between the executable program code in the instruction memory and the hardware processor is structural; the executable program code is provided to the hardware processor by imparting various voltages at certain times across certain electrical connections, in accordance with binary values in the executable program code, to cause the hardware processor to perform some action, as now explained in more detail.

A hardware processor may be thought of as a complex electrical circuit that is configured to perform a predefined set of basic operations in response to receiving a corresponding basic instruction selected from a predefined native instruction set of codes.

The predefined native instruction set of codes is specific to the hardware processor; the design of the processor defines the collection of basic instructions to which the processor will respond, and this collection forms the predefined native instruction set of codes.

A basic instruction may be represented numerically as a series of binary values, in which case it may be referred to as a machine code. The series of binary values may be represented electrically, as inputs to the hardware processor, via electrical connections, using voltages that represent either a binary zero or a binary one. These voltages are interpreted as such by the hardware processor.

Executable program code may therefore be understood to be a set of machine codes selected from the predefined native instruction set of codes. A given set of machine codes may be understood, generally, to constitute a module. A set of one or more modules may be understood to constitute an application program or "app." An app may interact with the hardware processor directly or indirectly via an operating system. An app may be part of an operating system.

Computer Program Product

A computer program product is an article of manufacture that has a computer-readable medium with executable program code that is adapted to enable a processing system to perform various operations and actions. Stated differently, the executable program code can embody or functionality of instructions that cause a computer, e.g., that cause the processor, to perform particular operations or processes.

A computer-readable medium may be transitory or non-transitory. A transitory computer-readable medium may be thought of as a conduit by which executable program code may be provided to a computer system, a short-term storage that may not use the data it holds other than to pass it on.

The buffers of transmitters and receivers that briefly store only portions of executable program code when being downloaded over the Internet is one example of a transitory computer-readable medium. A carrier signal or radio frequency signal, in transit, that conveys portions of executable program code over the air or through cabling such as fiber-optic cabling provides another example of a transitory computer-readable medium. Transitory computer-readable media convey parts of executable program code on the move, typically holding it long enough to just pass it on.

Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit.

The following forms of storage exemplify non-transitory computer-readable media: removable storage such as a universal serial bus (USB) disk, a USB stick, a flash disk, a flash drive, a thumb drive, an external solid-state storage device (SSD), a compact flash card, a secure digital (SD) card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

Creation of Executable Program Code

Software source code may be understood to be a human-readable, high-level representation of logical operations. Statements written in the C programming language provide an example of software source code.

Software source code, while sometimes colloquially described as a program or as code, is different from executable program code. Software source code may be processed, through compilation for example, to yield executable program code. The process that yields the executable program code varies with the hardware processor; software source code meant to yield executable program code to run on one hardware processor made by one manufacturer, for example, will be processed differently than for another hardware processor made by another manufacturer.

The process of transforming software source code into executable program code is known to those familiar with this technical field as compilation or interpretation and is not the subject of this application.

User Interface

A computer system may include a user interface controller under control of the processing system that displays a user interface in accordance with a user interface module, i.e., a set of machine codes stored in the memory and selected from the predefined native instruction set of codes of the hardware processor, adapted to operate with the user interface controller to implement a user interface on a display device. Examples of a display device include a television, a projector, a computer display, a laptop display, a tablet display, a smartphone display, a smart television display, or the like.

The user interface may facilitate the collection of inputs from a user. The user interface may be graphical user interface with one or more user interface objects such as display objects and user activatable objects. The user interface may also have a touch interface that detects input when a user touches a display device.

A display object of a user interface may display information to the user. A user activatable object may allow the user to take some action. A display object and a user activatable object may be separate, collocated, overlapping, or nested one within another. Examples of display objects include lines, borders, text, images, or the like. Examples of user activatable objects include menus, buttons, toolbars, input boxes, widgets, and the like.

Communications

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

Considerations

For any computer-implemented embodiment, "means plus function" elements will use the term "means;" the terms "logic" and "module" have the meaning ascribed to them above and are not to be construed as generic "means." An interpretation under 35 U.S.C. § 112(f) is desired only where this description and/or the claims use specific terminology historically recognized to invoke the benefit of interpretation, such as "means," or "means for" and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation.

The indication of any elements or steps as "optional" does not indicate that all other or any other elements or steps are mandatory. The claims define the invention and form part of the specification. Limitations from the written description are not to be read into the claims.

Certain attributes, functions, steps of methods, or substeps of methods described herein may be associated with physical structures or components, such as a module of a physical device that, in implementations in accordance with this disclosure, make use of instructions (e.g., computer executable instructions) that may be embodied in hardware, such as an application specific integrated circuit, or that may cause a computer (e.g., a general-purpose computer) executing the instructions to have defined characteristics. There may be a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an application programming interface (API). In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

While certain implementations have been described, these implementations have been presented by way of example only and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure.

The invention claimed is:

1. A security system comprising:
an enrollment logic configured to store in a user record in a user database:
reference biographic data about a user;
reference biometric data about the user;
a reference image of the user;
a first security kiosk configured to:
capture a first biographic information about the user from an ID card;
capture a first kiosk image of biometric information about the user from the ID card;
a second security kiosk configured to:
capture a second biographic information about the user from the ID card;
capture a second kiosk image of biometric information about the user from the ID card;
a third security kiosk configured to:
capture a third biographic information about the user from the ID card;
capture a third kiosk image of biometric information about the user from the ID card;
an $N^{th}$ security kiosk configured to:
capture an $N^{th}$ biographic information about the user from the ID card;
capture an $N^{th}$ kiosk image of biometric information about the user from the ID card; N is a natural number larger than 3;
the user database connected to the first security kiosk; the user database configured to store the first kiosk image, second kiosk image, third kiosk image, and $N^{th}$ kiosk image in an image gallery;
a surveillance camera configured to capture a set of surveillance images of the user; the set of images comprising a first surveillance image, a second surveillance image, a third surveillance image, and a $N^{th}$ surveillance image; wherein N is a natural number greater than 3;
a surveillance database comprising the set of surveillance images captured by a plurality of surveillance cameras;
a surveillance logic comprising a processor, computer readable media, memory, a network interface, and computer code non-transitorily stored in the memory and executable by the processor to cause the processor to:
execute a morphed image detection algorithm comprising parameters;
determine a first relative similarity value of the first surveillance image as compared to the reference image;
determine a second relative similarity value of the second surveillance image as compared to the reference image;
determine a third relative similarity value of the third surveillance image as compared to the reference image;
determine a $N^{th}$ relative similarity value of the Nth surveillance image as compared to the reference image;

flag the first surveillance image as a morphed image if any of the relative similarity values are below a similarity threshold; and flag the first surveillance image as not comprising a morphed image if none of the relative similarity values are below the similarity threshold;

communication logic configured to send a signal to an access control device comprising:

instructions to shift the access control device into an access granted position if the surveillance logic has flagged the ID card as not comprising a morphed image;

instructions to shift the access control device into an access denied position if the surveillance logic has flagged the ID card as comprising a morphed image; and the access control device configured to receive the signal from the communication logic and shift into the access granted position or access denied position depending on the instructions.

2. The security system of claim 1 comprising a user identification logic configured to:

compare a plurality of kiosk images captured within a preset time period against the first flagged surveillance image;

generate a similarity score for the kiosk images and the first flagged surveillance image;

select one or more kiosk images having a similarity score above an identification threshold value;

identify one or more ID cards associated with the one or more selected kiosk images;

obtain the biographic data about the user associated with the one or more identified ID cards from the user database;

identify the user associated with the biographic data; and send a message to a system operator; the message containing a designation that the user has been flagged for using a morphed image, a copy of the user's reference image from the ID card, and at least some of the biographic data of the user.

3. The security system of claim 1 wherein the security system is configured to:

identify an image on an ID card as a morphed image;

identify the user that presented the ID card as a valid form of identification;

identify additional users bearing a resemblance to the morphed image on the ID card; and instruct the access control device to shift into the access denied position when the user arrives at the access control device.

4. The security system of claim 1 wherein the surveillance logic is configured to:

determine a first relative dissimilarity value of the first surveillance image as compared to the reference image;

determine a second relative dissimilarity value of the first surveillance image as compared to the reference image;

determine a third relative dissimilarity value of the first surveillance image as compared to the reference image;

determine a $N^{th}$ relative dissimilarity value of the first surveillance image as compared to the reference image;

flag the first surveillance image as a morphed image if any of the relative dissimilarity values are above a dissimilarity threshold; and flag the first surveillance image as not comprising a morphed image if none of the relative similarity values are above the dissimilarity threshold.

5. The security system of claim 1 comprising a training system comprising a second processor, second computer readable media, second memory, a second network interface, and second computer code non-transitorily stored in the second memory and executable by the second processor to cause the second processor to determine values for the parameters through machine learning.

6. The security system of claim 5 wherein in the training system is configured to:

set an initial similarity value for a similarity threshold;

set an initial dissimilarity value for a dissimilarity threshold;

determine a calibrated similarity value for the similarity threshold that generates a lowest false positive rate and false negative rate when the surveillance logic uses the similarity threshold for processing of surveillance images; and determine a calibrated dissimilarity value for the dissimilarity threshold that generates a lowest false positive rate and false negative rate when the surveillance logic uses the dissimilarity threshold for processing of surveillance images.

7. The security system of claim 6 wherein in the training system comprises a dataset images comprising morphed images and not morphed images.

8. The security system of claim 7 wherein the training system is configured to:

process the dataset images with the morphed image detection algorithm;

determine whether the dataset images are morphed or not morphed;

determine a first false positive rate for dataset images that have been identified as morphed images when the dataset images are not morphed;

execute an error rate calibration process comprising:

adjusting the initial similarity value to a second similarity value;

executing the morphed image detection algorithm on the dataset images that were previously processed by surveillance logic;

determining a second false positive rate for dataset images that have been identified as morphed images when the dataset images are not morphed using the second similarity value for the similarity threshold; and comparing the first false positive rate to the second false positive rate and selecting a false positive rate that has a lower value.

9. The security system of claim 8 comprising repeating the error rate calibration process X times, repeating the error rate calibration process comprises:

adjusting an $X-1^{th}$ similarity value to an $X^{th}$ similarity value; wherein X is a natural number larger than 2;

executing the morphed image detection algorithm on the dataset images that were previously processed by the surveillance logic using the Xi similarity value;

determining an $X^{th}$ false positive rate for dataset images that have been identified as morphed images when the dataset images are not morphed using the $X^{th}$ similarity value for the similarity threshold;

comparing the $X^{th}$ false positive rate to previously calculated false positive rates;

determining a lowest false positive rate of the previously calculated false positive rates; and setting the calibrated similarity value to a similarity value that the lowest false positive rate.

10. The security system of claim 7 wherein the training system is configured to:
  process the dataset images with the morphed image detection algorithm;
  determine whether the dataset images are morphed or not morphed;
  determine a first false positive rate for dataset images that have been identified as morphed images when the dataset images are not morphed;
  determine a first false negative rate for dataset images that have been identified as not morphed images when the dataset images are morphed;
  execute an error rate calibration process comprising:
    adjusting the initial similarity value to a second similarity value;
    adjusting the initial dissimilarity value to a second dissimilarity value;
    executing the morphed image detection algorithm on the dataset images that were previously processed by surveillance logic;
    determining a second false positive rate for dataset images that have been identified as morphed images when the dataset images are not morphed using the second similarity value for the similarity threshold;
    determining a second false negative rate for dataset images that have been identified as not morphed images when the dataset images are morphed using the second dissimilarity value for the dissimilarity threshold;
    comparing the first false positive rate to the second false positive rate and selecting a false positive rate that has a lower value;
    comparing the first false negative rate to the second false negative rate and selecting a false negative rate that have a lower value;
  repeating the error rate calibration process X times, wherein X is a natural number larger than 2; wherein repeating the error rate calibration process comprises:
    adjusting an $X-1^{th}$ similarity value to an $X^{th}$ similarity value;
    adjusting an $X-1^{th}$ dissimilarity value to an Xi dissimilarity value;
    executing the morphed image detection algorithm on the dataset images that were previously processed by surveillance logic using the $X^{th}$ similarity value and $X^{th}$ dissimilarity value;
    determining an $X^{th}$ false positive rate for dataset images that have been identified as morphed images when the dataset images are not morphed using the $X^{th}$ similarity value for the similarity threshold;
    determining an $X^{th}$ false negative rate for dataset images that have been identified as not morphed images when the dataset images are morphed using the Xi dissimilarity value for the dissimilarity threshold;
    comparing the $X^{th}$ false positive rate to previously calculated false positive rates;
    determining a lowest false positive rate of the previously calculated false positive rates;
    comparing the $X^{th}$ false negative rate to previously calculated false negative rates;
    determining a lowest false negative rate of the previously calculated false positive rates; and
    setting the calibrated similarity value to a similarity value that generated a lowest mean value for the false negative rate and false positive rate.

11. The security system of claim 1 comprising a training system comprising a second processor, second computer readable media, second memory, a second network interface, and second computer code non-transitorily stored in the second memory and executable by the second processor to cause the second processor to determine values for the parameters through machine learning; the training system connected to a dataset images comprising morphed images and not morphed images.

12. The security system of claim 11 wherein in the training system is configured to:
  set an initial similarity value for the similarity threshold;
  determine a calibrated similarity value for the similarity threshold that generates a lowest error rate when the surveillance logic uses the similarity threshold for processing of surveillance images; wherein an error rate is a false positive rate or a false negative rate.

13. The security system of claim 12 wherein the training system is configured to:
  process the dataset images with the morphed image detection algorithm;
  determine whether the dataset images are morphed or not morphed;
  determine a first error rate for dataset images that have been misidentified; wherein misidentified includes:
    identifying dataset images as morphed images when the dataset images are not morphed images; or
    identifying dataset images as not morphed images when the dataset images are morphed images;
  execute an error rate calibration process comprising:
    adjusting the initial similarity value to a second similarity value;
    executing the morphed image detection algorithm on the dataset images that were previously processed by surveillance logic;
    determining a second error rate for dataset images that have been misidentified;
    comparing the first error rate to the error rate and selecting an error rate that has a lower value;
  repeating the error rate calibration process X times, wherein X is a natural number larger than 2;
    adjusting an $X-1^{th}$ similarity value to an $X^{th}$ similarity value;
    executing the morphed image detection algorithm on the dataset images that were previously processed by surveillance logic using the $X^{th}$ similarity value;
    determining an $X^{th}$ error rate for dataset images that have been identified as morphed images when the dataset images are not morphed using the Xi similarity value for the similarity threshold;
    comparing the $X^{th}$ error rate to previously calculated error rates;
    determining a lowest error rate of the previously calculated error rates; and
    setting the calibrated similarity value to a similarity value that the lowest error rate.

14. A security system comprising:
  an enrollment logic configured to store in a user record in a user database:
    reference biographic data about a user;
    reference biometric data about the user;
    a reference image of the user;
  a first security kiosk configured to:
    capture a first biographic information about the user from an ID card;
    capture a first kiosk image of biometric information about the user from the ID card;

a second security kiosk configured to:
  capture a second biographic information about the user from the ID card;
  capture a second kiosk image of biometric information about the user from the ID card;
the user database connected to the first security kiosk; the user database configured to store the first kiosk image and second kiosk image in an image gallery;
a surveillance camera configured to capture a set of surveillance images of the user; the set of images comprising a first surveillance image and a second surveillance image;
a surveillance database comprising the set of surveillance images captured by a plurality of surveillance cameras;
a surveillance logic comprising a processor, computer readable media, memory, a network interface, and computer code non-transitorily stored in the memory and executable by the processor to cause the processor to:
  execute a morphed image detection algorithm comprising parameters;
  determine a first relative similarity value of the first surveillance image as compared to the reference image;
  determine a second relative similarity value of the second surveillance image as compared to the reference image;
  flag the first surveillance image as a morphed image if any of the relative similarity values are below a similarity threshold; and
  flag the first surveillance image as not comprising a morphed image if none of the relative similarity values are below the similarity threshold;
communication logic configured to send a signal to an access control device comprising:
  instructions to shift the access control device into an access granted position if the surveillance logic has flagged the ID card as not comprising a morphed image;
  instructions to shift the access control device into an access denied position if the surveillance logic has flagged the ID card as comprising a morphed image; and
the access control device configured to receive the signal from the communication logic and shift into the access granted position or access denied position depending on the instructions.

15. A method for controlling security comprising:
an enrollment logic storing in a user record in a user database:
  reference biographic data about a user;
  reference biometric data about the user;
  a reference image of the user;
a first security kiosk:
  capturing a first biographic information about the user from an ID card;
  capturing a first kiosk image of biometric information about the user from the ID card;
a second security kiosk:
  capturing a second biographic information about the user from the ID card;
  capturing a second kiosk image of biometric information about the user from the ID card;
the user database connected to the first security kiosk; the user database storing the first kiosk image and second kiosk image in an image gallery;
a surveillance camera capturing a set of surveillance images of the user; the set of images comprising a first surveillance image and a second surveillance image;
a surveillance database storing the set of surveillance images captured by a plurality of surveillance cameras;
a surveillance logic comprising a processor, computer readable media, memory, a network interface, and computer code non-transitorily stored in the memory and executable by the processor to cause the processor to perform steps including:
  executing a morphed image detection algorithm comprising parameters;
  determining a first relative similarity value of the first surveillance image as compared to the reference image;
  determining a second relative similarity value of the second surveillance image as compared to the reference image;
  flagging the first surveillance image as a morphed image if any of the relative similarity values are below a similarity threshold; and
  flagging the first surveillance image as not comprising a morphed image if none of the relative similarity values are below the similarity threshold;
a communication logic sending a signal to an access control device;
the access control device receiving the signal from the communication logic;
the access control device shifting into an access granted position if the surveillance logic has flagged the ID card as not comprising a morphed image; and
the access control device shifting into an access denied position if the surveillance logic has flagged the ID card as comprising a morphed image.

* * * * *